United States Patent
Escobar Gonzales et al.

(10) Patent No.: US 6,636,589 B2
(45) Date of Patent: Oct. 21, 2003

(54) CASCADE ACCOUNTING OF CONNECTION-ORIENTED COMMUNICATION SESSIONS IN A TELECOMMUNICATION SYSTEM

(75) Inventors: Florencio Escobar Gonzales, Madrid (ES); Isidoro Garzon Herrero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 09/873,288

(22) Filed: Jun. 5, 2001

(65) Prior Publication Data

US 2001/0050981 A1 Dec. 13, 2001

(30) Foreign Application Priority Data

Jun. 7, 2000 (EP) .............................. 00111825

(51) Int. Cl.$^7$ ............................................. H04M 15/00
(52) U.S. Cl. .............................. 379/112.09; 379/112.07; 379/112.08
(58) Field of Search ................. 379/112.09, 112.08, 379/112.07; 709/223, 203, 227, 201; 707/206; 370/401, 400

(56) References Cited

U.S. PATENT DOCUMENTS

| | | | |
|---|---|---|---|
| 5,008,929 A | | 4/1991 | Olsen et al. |
| 5,712,908 A | | 1/1998 | Brinkman et al. |
| 5,732,127 A | | 3/1998 | Hayes |
| 5,875,238 A | | 2/1999 | Glitho et al. |
| 5,878,031 A | * | 3/1999 | Ahmad et al. ............ 370/249 |
| 5,912,954 A | | 6/1999 | Whited et al. |
| 6,307,924 B1 | * | 10/2001 | Rosenberg ............ 379/115.01 |

FOREIGN PATENT DOCUMENTS

| | | |
|---|---|---|
| EP | 0 948 162 A2 | 10/1999 |
| WO | 98/11712 | 9/1997 |
| WO | 98/17079 | 4/1998 |

OTHER PUBLICATIONS

*International Telecommunication Union*, ITU–T Recommendation Q.752, Series Q: Switching and Signalling, Specifications of Signalling System No. 7—Signalling System No. 7 management, Jun. 1997, "Monitoring and Measurements for Signalling System No. 7 Networks".

* cited by examiner

Primary Examiner—Curtis Kuntz
Assistant Examiner—Barry W Taylor
(74) Attorney, Agent, or Firm—Nixon & Vanderhye, P.C.

(57) ABSTRACT

A connection-oriented telecommunication system (SYS) comprises a first network (A), at least one transit network (B, C) and a second network (D). The exchanges (EX, N10,N20, N30, N40) of the net works each comprise a plurality of incoming communication resources (InCS) and outgoing communication resources (OutCS) each storing a pair of a verification accounting reference (VerAccRef) and a remuneration accounting reference (RemAccRef). By determining such a pair of and storing such verification and remuneration accounting reference pairs for each communication-session all forward signalling messages ($SFM_j$, $SFM_i$) received by an incoming communication resource ($InCS_j$) or transmitted by an outgoing communication resource ($OutCS_i$) and all backward signalling messages ($BSM_j$, $BSM_i$) transmitted by the incoming communication resource ($InCS_j$) and received by the outgoing communication resource ($OutCS_i$) can be accounted for by a respective verification and remuneration accounting means (VER1, VER2, REM2, VER2) respectively indicated by the accounting reference pair. Since all forward and backward signalling messages can be accounted for, the transit networks can respectively charge each other or the first or second network more accurately for handling the signalling messages of a connection-oriented communication-session.

19 Claims, 20 Drawing Sheets

PRINCIPLE OF THE INVENTION

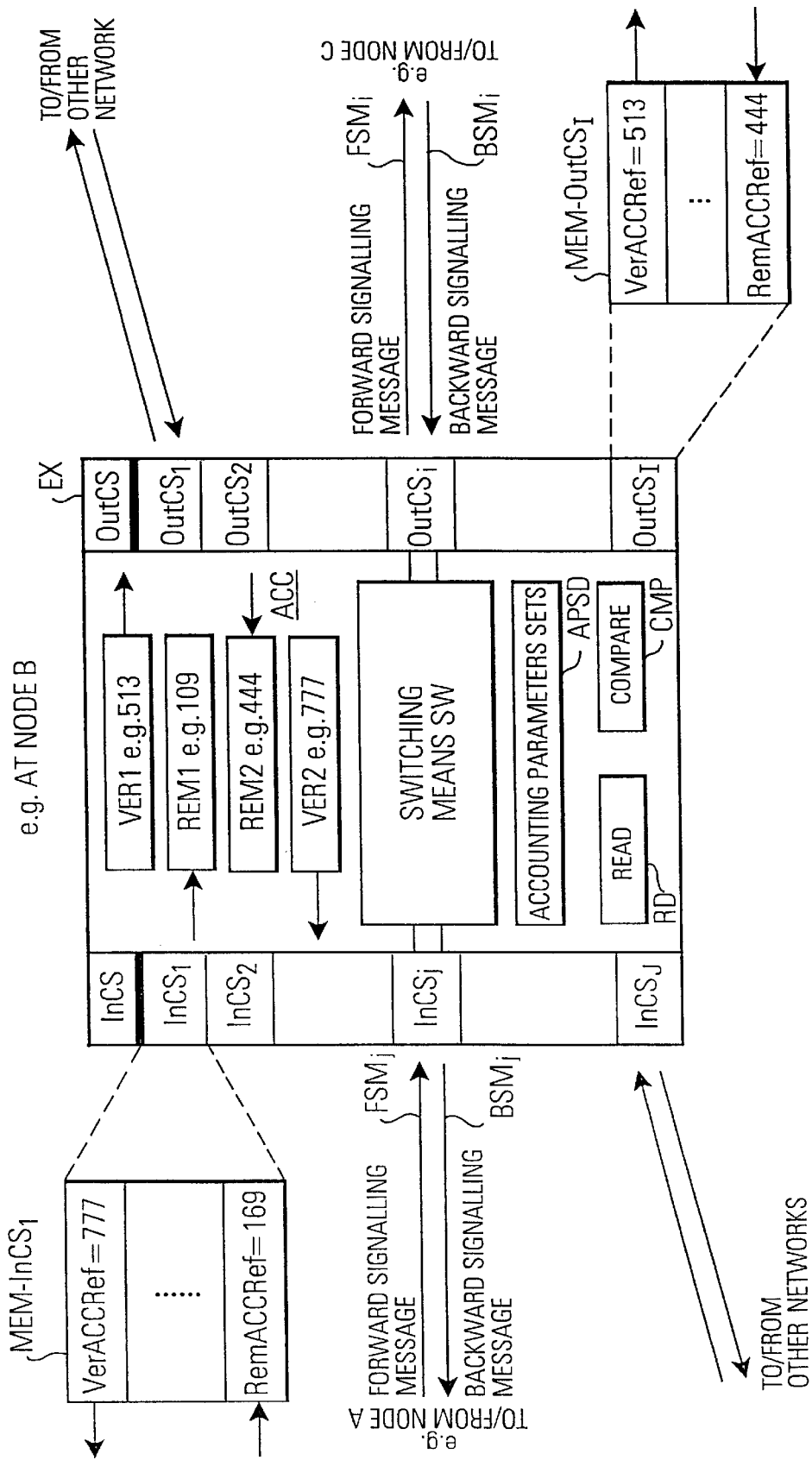
FIG.4b PRINCIPLE OF THE INVENTION

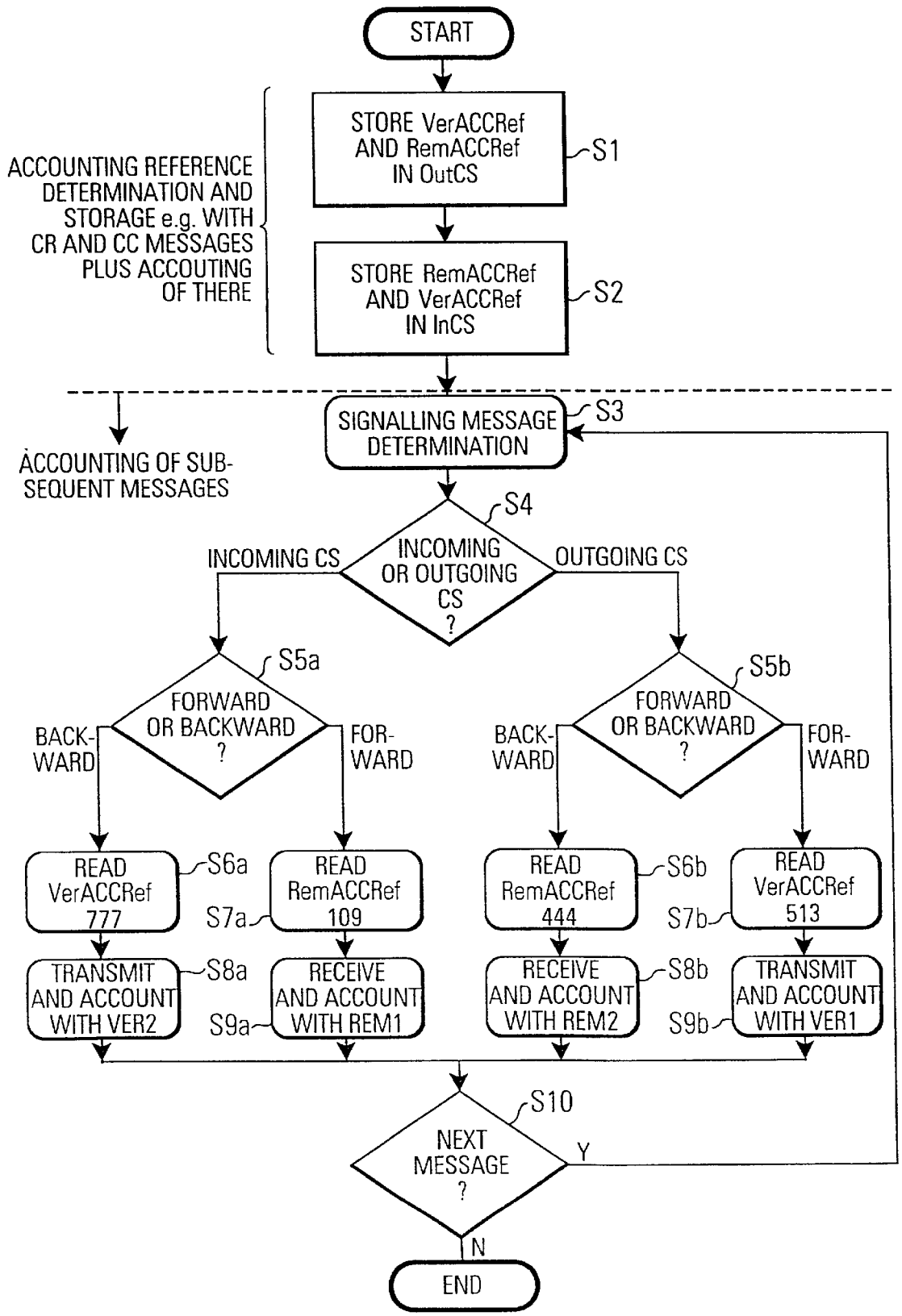
FIG.4c  PRINCIPLE OF THE INVENTION

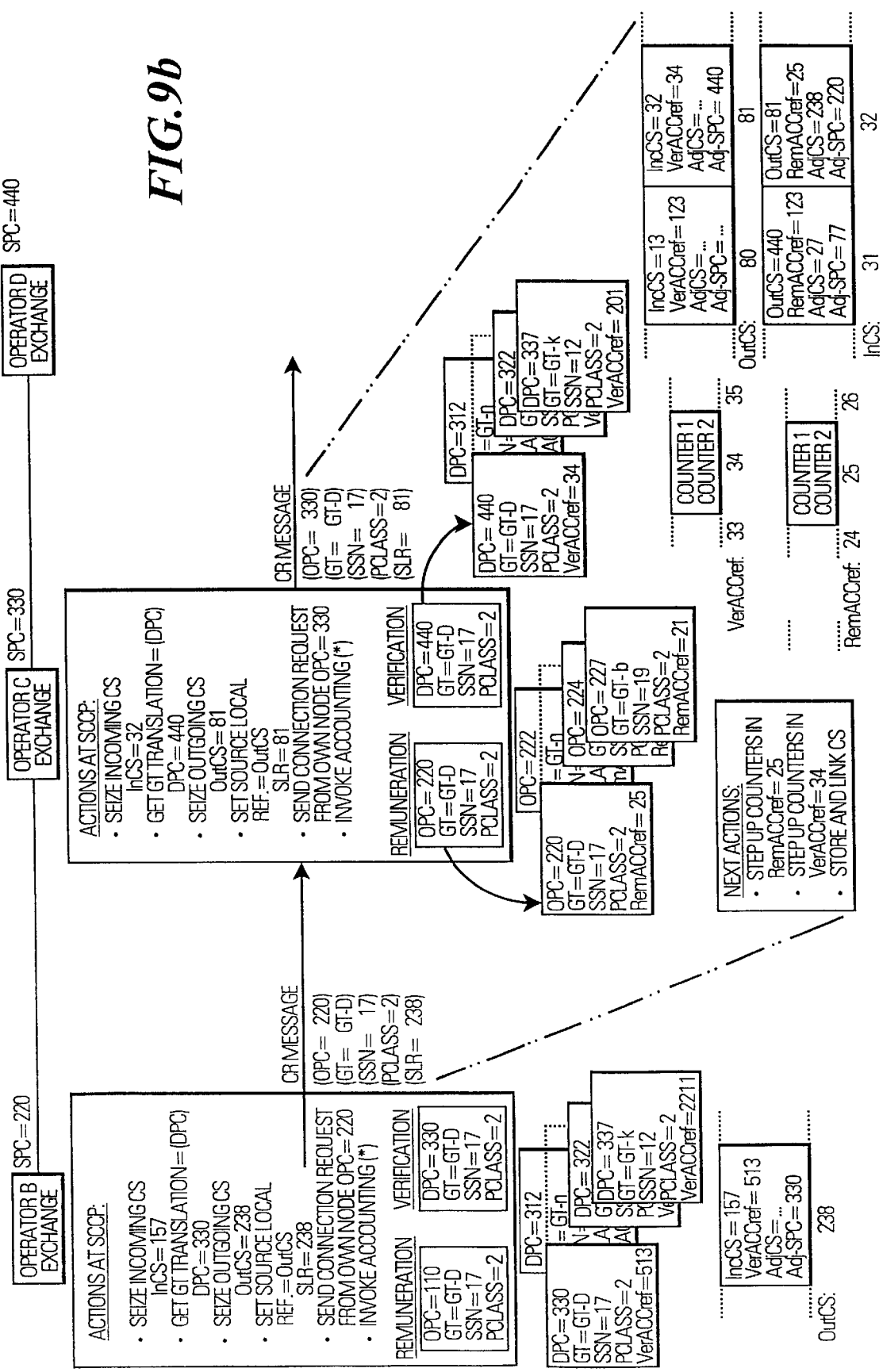

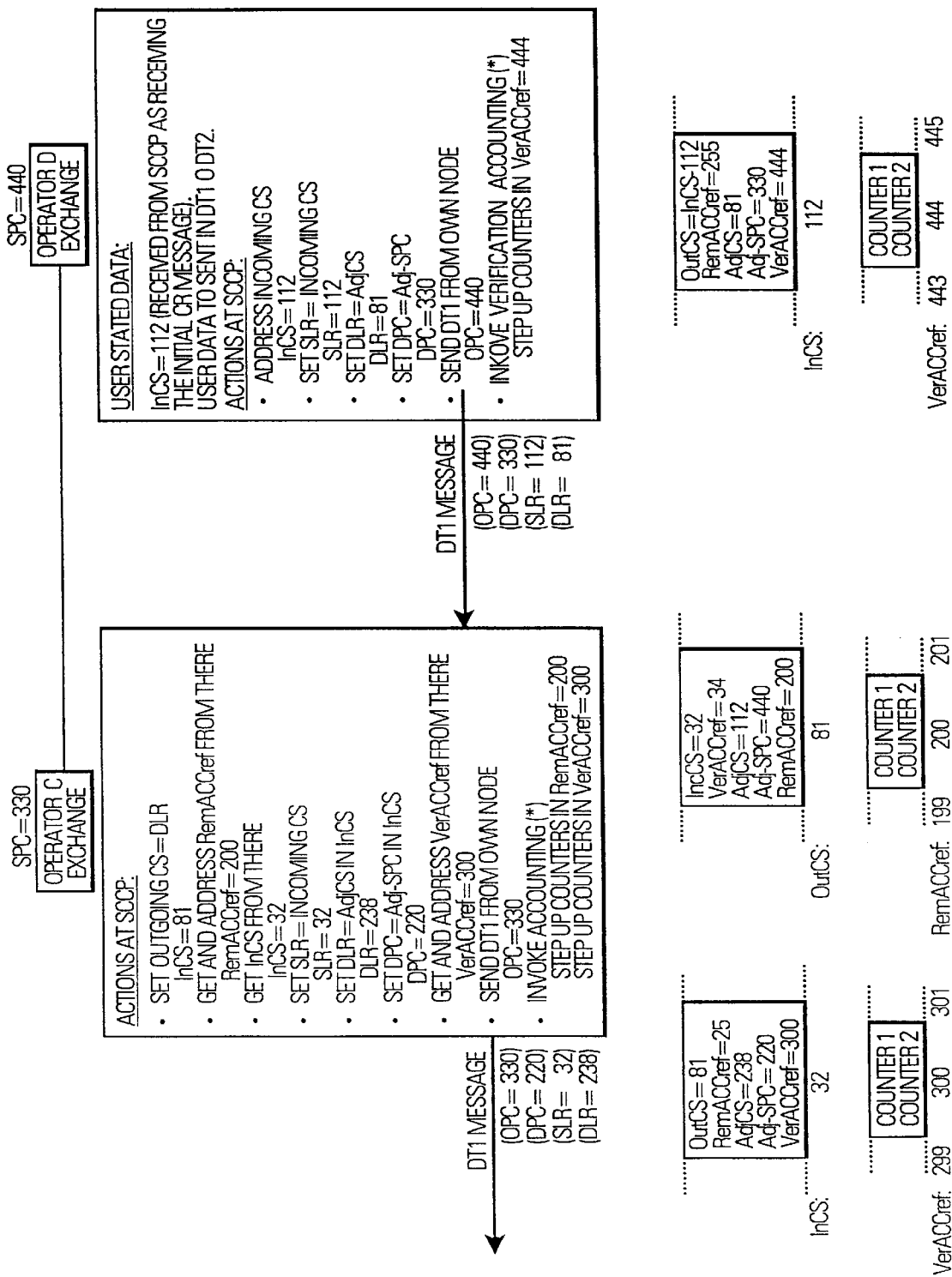

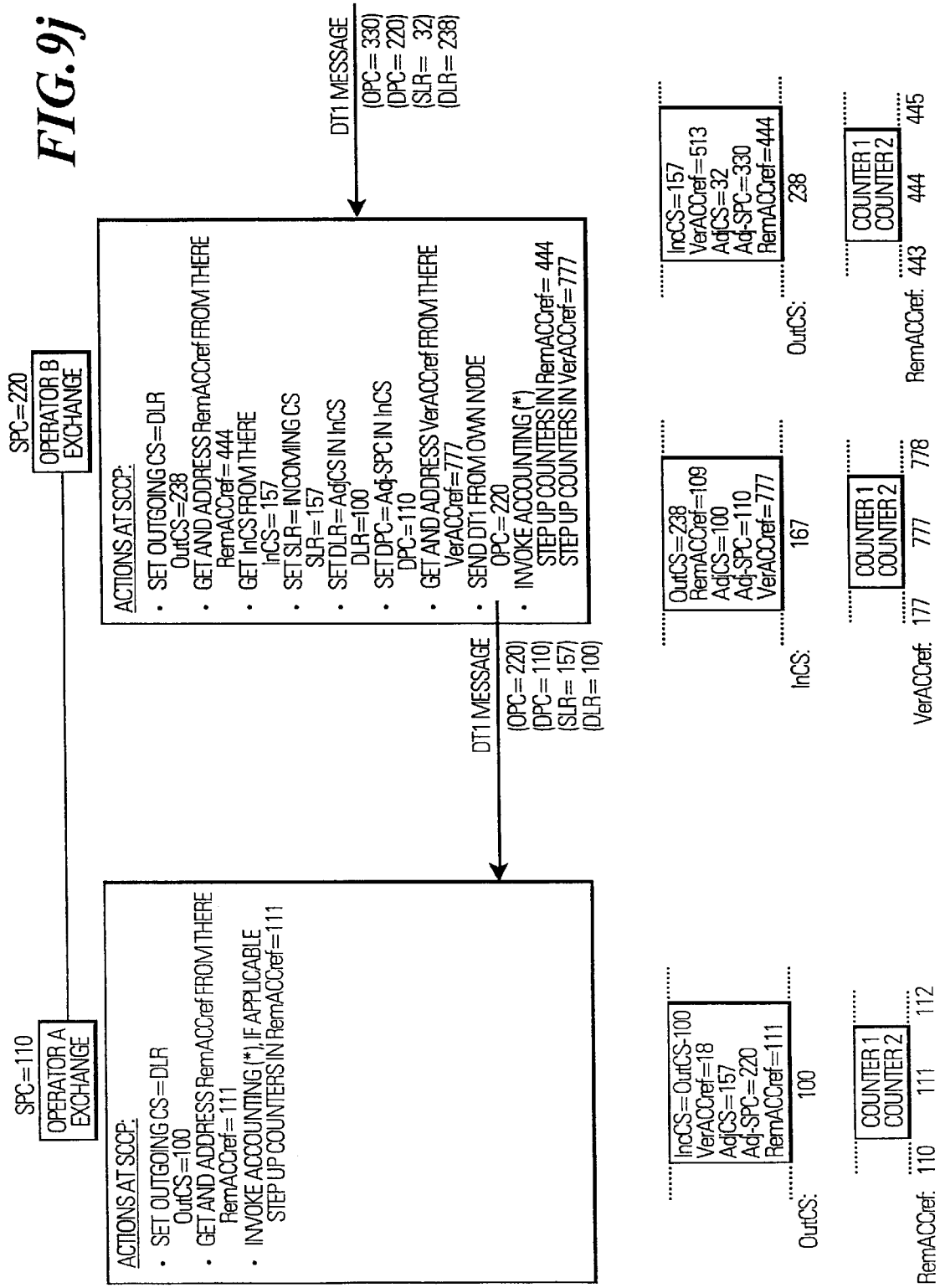

CASCADE ACCOUNTING OF CONNECTION-ORIENTED COMMUNICATION SESSIONS IN A TELECOMMUNICATION SYSTEM

FIELD OF THE INVENTION

The present invention relates to a method and an exchange for cascade accounting of connection-oriented communication sessions which are maintained between a first and a second subscriber station of a telecommunication system operating with connection-oriented services. The telecommunication system comprises a first network serving a plurality of said first subscriber stations, at least one transit network and a second network serving a plurality of said second subscriber stations. Each network comprises at least one exchange having a plurality of incoming communication resources and outgoing communication resources for respectively handling forward signalling messages and backward signalling messages sent in the direction from the first subscriber station to the second subscriber station and in the direction from the second subscriber station to the first subscriber station.

The class of telecommunication systems considered by the present invention relates to connection-oriented telecommunication systems in which a respective connection-oriented communication session between a first and second subscriber station is typically conducted in two stages. In a first stage communication request and communication confirmation messages are exchanged between the first and second subscriber station to negotiate and set in each exchange of the first network, the transit network and the second network communication data which clearly define the path (a logical pipe) between all incoming and outgoing communication resources of the respective exchanges. In the second phase the actual transfer of data messages (and other signalling messages) is carried out only along this predefined logical path. Only the communication request message contains routing data and an identification of the called subscriber station. Optionally, the connection confirmation might as well can contain such data types.

Since a connection (path) is predefined by the exchange of the request and confirmation messages, such communication sessions are called "connection-oriented". By contrast, in connectionless communication sessions each signalling message of the communication session contains routing data and identifications of the called subscriber station such that each message may be routed through a different path such that each signalling message may use different sets of incoming and outgoing communication resources. Since for each signalling message the transfer path may change, such communication sessions are called "connectionless" i.e. without a preset connection.

In both types of telecommunication systems the transit network (and also the first and the second network) must carry out accounting procedures of the signalling traffic received from the first and second network in order to appropriately charge both networks for the routing of the signalling messages. The counting is typically done by counting the number of routed signalling messages and/the number of octets (the amount of data) transferred by each message. Since in a connection-less telecommunication system each signalling message contains the routing data as well as the called party identification the transit network has no problems to relate each received and transmitted signalling message to a particular communication session. Thus, an accurate accounting relating the respective signalling traffic to the correct communication session can be performed.

However, in connection-oriented telecommunication systems used nowadays, only the connection request and optionally the request confirmation message contains the routing data and called party identification (for setting the logical path) and the subsequent messages lack this information such that only the first messages of the communication session can be used for accounting purposes. Thus, the accounting is not very accurate. The present invention in particular addresses the problem how an accurate accounting can be provided for the signalling traffic in a connection-oriented telecommunication system.

Although hereinafter the background of the invention will be described in terms of the Connection-Oriented service offered by the Signalling Connection Control Part (hereinafter denoted with SCCP) of the Signalling System Number 7 (hereinafter denoted SS7) similar considerations hold for any other connection-oriented telecommunication system.

In the telecommunication networks which make use of the "Signalling System Number 7" different network operators are given the means to charge each other for the use of own network resources and also to verify by themselves that they are correctly charged by other network operators. However, as generally mentioned above for general connection-oriented telecommunication systems, also the SCCP SS7 telecommunication system suffers from the fact that the accounting is not very accurate. This will be explained below with more details regarding the background of the invention.

BACKGROUND OF THE INVENTION

Currently existing telecommunication networks, both wireline and wireless related networks, still make use of the "Common Channel Signalling System Number 7 (hereinafter SS7) protocol stack to implement layers lower than the application layer according to the OSI model.

Said SS7 protocol stack consists of different parts, standardised by ITU-T and ANSI Recommendations. For the purpose of the present invention, just one of them, the Signalling Connection Control Part (hereinafter SCCP), is affected.

Under said SCCP there must be an appropriate protocol stack to build up the Physical, Link and Network layers. Traditionally, the Message Transport Part described by ITU-T and part of SS7, provided these lower three layers above. Nowadays, and justified by the wide growth of Internet, other protocol means can replace the older MTP for this purpose such as the Transmission Control Protocol (hereinafter TCP), or User Datagram Protocol (hereinafter UDP), or the recently suggested Simple Control Transmission Protocol (hereinafter SCTP) over the Internet Protocol (hereinafter IP).

As already explained above for a general connection-oriented system, from a signalling transmission point of view, two different sorts of services are also provided by SCCP, namely Connectionless and Connection-Oriented services.

As above mentioned, the main difference to outline between both services, for the purpose of the present invention, is that all the individual signalling exchanged within the connectionless service contains routing data and identifiers of the Called Party. However, this is not the case within the Connection-Oriented service wherein just the initial Connection Request message contains routing data and identifiers of the Called Party. For the sake of clarity it should be noticed that the Connection Confirm message could also contain routing data and identifiers of the Called Party, however, since these parameters are optional in said Connection Confirm message, other standard mechanisms apply as routing such messages.

Well-known functionalities of the SCCP Connectionless service are the Mobile Application Part used by GSM and the Intelligent Network Application Part, whereas well-known functionalities of the Connection-Oriented service are the Base Station System Application Part, also used by GSM, and the Radio Access Network Application Part used by UMTS (Universal Mobile Telecommunication System).

An important concept for the purpose of the present invention, is the meaning of Accounting and, more specifically, the SCCP Accounting. Accounting basically relates to the necessity that the different SS7 network operators have to charge each other for the use of own network resources as well as have to verify themselves that they are correctly charged by other operators. Both features together are referred to as Accounting. Given that these features, charging and verification, are taken into consideration when transferring signalling between different network operators, the invocation of such features is absolutely depending on the routing analysis result. As a direct consequence of this dependency between routing results and charging or verification invocation, both routing and accounting require similar sets of parameters, and both take place at the same layers in the SS7 protocol stack, namely SCCP and MTP. For the purpose of the present invention, further and deeper explanations are only provided for SCCP Accounting.

SCCP Accounting between operators uses the concept of Cascade Accounting as illustrated in FIG. 1. The assumption for the example in FIG. 1 is that Network Operator A of the first network A is the originating end user and Network Operator D of the second network D is the destination end user, whereas Network Operator B and Network Operator C are transit networks. Under this assumption, the Network Operator B will charge the Network Operator A for transmitting his signalling towards the Network Operator C. Based on the same principle, the Network Operator C will charge the Network Operator B for transmitting his signalling towards the Network Operator D.

The principle behind this method is that the operator of a signalling point N10 originating a message pays the operator owning the next signalling point N20 for the signalling path to be followed for delivering such a message. The latter signalling point N20 pays the operator that owns the next signalling point N30 for the signalling path, and so on. In this accounting method, intermediate signalling points owned by the same operator as the previous signalling point are not an object of accounting. The method rather applies to those signalling points for which the next signalling point encountered in a message path is owned by a different operator.

In the Cascade Accounting method, two main accounting concepts are used. On the one hand, the Remuneration Accounting F20, F30 is the measurement of signalling traffic received from an operator S10, S20. This measurement is used to charge other operators A, B for their usage of the own signalling point related resources N20, N30. On the other hand, the Verification Accounting F15, F25 is the measurement of signalling traffic sent towards another operator S10, S20. This measurement is used to verify that the own signalling point N10, N20 is correctly charged from other operators (B, C) for the usage of their resources (N20, N30).

In order to apply the principles above, and more specifically, for SCCP Accounting, the operator has to establish appropriate accounting criteria. Under these accounting criteria, measurements can be made of the SCCP signalling traffic. Moreover, these accounting criteria are very closely related to those SCCP parameters needed by the routing analysis function.

In this respect, examples of such SCCP parameters are the Global Title (hereinafter GT), the applicable Signalling Point Code (hereinafter SPC) and, optionally, the Subsystem Number (hereinafter SSN). Still another SCCP parameter, which is not directly used by the routing analysis function though significant for accounting, is the Protocol Class (hereinafter PCLASS) parameter used in particular to differentiate between SCCP Connectionless and SCCP Connection-Oriented services.

The SPC is a number that designates a Signalling Point of a certain network. Said SPC is commonly referred to either as Originating signalling Point Code (hereinafter OPC), or as Destination signalling Point Code (hereinafter DPC) depending on whether the accounted SCCP message comes from the former or goes to the latter. The SSN is a number that designates an application or, in other words, an SCCP user. A GT is an address, such as dialed digits, that unambiguously identifies the entity or application making use of the SCCP services. The GT must be translated during the routing process to get a destination in the SCCP network for the processed message. This destination is normally obtained in terms of a DPC accompanied or not by an SSN.

More specifically, for SCCP Connection-Oriented service, the Global Title is only used for routing during the connection establishment phase when a Connection Request message is processed. Even though the Connection Confirm message could occasionally contain a GT, other mechanisms can apply as well so that such a Connection-Oriented message can not be considered instance of GT based routing. As generally explained above, once the connection is established the subsequent messages do not include GT and the routing is based on the corresponding Connection Sections identifiers.

A Connection Section (hereinafter CS) represents the logical path between two signalling points within a logical signalling association between two connection-oriented SCCP users. This signalling association may consist of one or more Connection Sections. These Connection Sections are dynamically distributed and are only alive during the connection session lifetime.

FIG. 2 illustrates this concept as well as its further applicability for routing of Connection-Oriented signalling other than Connection Request messages. The end user node (Exchange A) originating a Connection Request message CR assigns an outgoing Connection Section outCS-a that is included as sending said CR message. When such a CR message is received in the first transit node (Exchange B), and when a next transit node (exchange C) is determined from the routing analysis, an incoming inCS-b and an outgoing outCS-b Connection Section are assigned and internally linked. Besides, the outgoing Connection Section outCS-b is determined as sending the CR message. When such a CR message is received in the next transit node (Exchange C) a similar process as for the previous node takes place, and said CR message is sent to the destination end user (Exchange D) with the latest outgoing Connection Section outCS-c. When said CR message is received at the destination end user (Exchange D), an incoming Connection Section inCS-d is assigned, such a message is processed and delivered to the application, and a Connection Confirm message CC is sent backwards. Said CC message includes the recently assigned incoming Connection Section (inCS-d) as well as the outgoing Connection Section outCS-c received from the previous node.

The node receiving said CC message (Exchange C) gets from an internal association the incoming Connection Section incCS-c linked to the received one outCS-c wherein said incoming Connection Section incCS-c contains data such as the outgoing Connection Section outCS-b from the originating side. Then, such a CC message is sent back to the previous node (Exchange B) with the own Connection Section identifier, now incCS-c, and the receiver one outCS-b. When such a CC message is received in next backward node (Exchange B) a similar process takes place, and said CC message is sent backwards with the own Connection Section inCS-b and the receiver Connection Section outCS-a.

From now on, all the subsequent messages from both end users, other than CR and CC indeed, for example forward and backward data messages DT1, DT2, are sent throughout the path linked by means of Connection Sections identifiers.

Under these assumptions, the accounting criteria (an accounting parameter set) are built up by the operator as a unique combination of the SCCP parameters for example, specifically, the OPC, DPC, and Called Party GT (and possibly also SSN, PCLASS). The SCCP messages, both received at a certain SCCP node and those to be sent towards another SCCP node, are analysed versus these accounting criteria in the accounting parameter set.

When the message parameters (or generally a communication or call parameter set) of a certain SCCP message under analysis match an accounting criterion parameter set defined by the operator, the message is registered either in the corresponding Remuneration Counter e.g. F21 if the message is incoming, or in the Verification Counter, e.g. F26 if the message is outgoing.

FIG. 1 shows how outgoing signalling traffic S10, sent from the SCCP layer in a Signalling Point N10, triggers the invocation of Verification Accounting F15 and registration of Verification Counters F16. FIG. 1 also shows how incoming signalling traffic S10, received at the SCCP layer in a Signalling Point N20, triggers the invocation of Remuneration Accounting F20 and registration of Remuneration Counters F21. Both Remuneration and Verification counters F21 and F16 respectively) are aimed to match each other. A similar principle applies to the signalling S20 sent from the Signalling Point N20 in network B and received in the Signalling Point N30 in network C, and the way in which the corresponding Verification Function F25, Verification Counter F26, Remuneration Function F30 and Remuneration Counter F31 are involved.

State of Art (SCCP SS7 Accounting)

In accordance with the ITU-T Specification Q.752, the SCCP Accounting is only applicable when a Global Title Translation takes place, for example at relay nodes or gateways between SS7 networks.

As mentioned above already for a general connection-oriented system, this means that in case of Connection-Oriented signalling traffic only the Connection Request (CR) message can be accounted since said message is the only Connection-Oriented protocol related message routed on Global Title.

The rest of Connection-Oriented protocol related messages needed for a communication session are not routed on Global Title and, consequently, are excluded from the traffic registration procedures for accounting purpose.

More specifically, once the connection has been set up with a Connection Confirm (hereinafter CC) message and during the connection lifetime, the main disadvantage regarding an accurate accounting is that all the information exchanged by means of Data Form 1 (hereinafter DT1) or Data Form 2 (hereinafter DT2) messages is never registered for Accounting purposes. Furthermore, also those messages intended to release the connection, such as the Released message (hereinafter RLSD) and the Release Complete message (hereinafter RLC) are never included in the Accounting procedure.

FIG. 3a schematically shows a flow diagram of a connection set up within a Connection-Oriented service wherein just the initial CR message is registered for Accounting purposes. All the confirmation message CC and all the information exchanged by the end-users with DT1 messages as well as the release messages are ignored for Accounting purposes.

Still another explanatory flow diagram in FIG. 3b presents an example of the signalling sequence followed during call establishment and release in a Universal Mobile Telecommunication System (hereinafter UMTS) network and, in particular, the SCCP Connection-Oriented signalling exchanged between the UMTS Mobile Switching Centre (hereinafter UMSC) and the Radio Network Controller (hereinafter RNC). A Transit network Node is included between the UMSC and the RNC to justify the needs for accounting in said Transit network Node.

FIG. 3b shows a certain amount of SCCP Connection-Oriented messages, namely SCCP CR messages, SCCP CC, SCCP DT1, SCCP RLSD and SCCP RLC. Within this general procedure just the initial CR messages (1 out of 17 messages) are registered for Accounting purposes in the Transit network Node.

Bearing in mind that an accurate Accounting is necessary for operators to be able to correctly charge each other for the usage of their respective network resources, the current state of art for Accounting of Connection-Oriented service only allows the charging of the initial CR message. Consequently, the operators will be only charged depending on the number of connections requested to be set up, (i.e. on the basis of the Connection-Request message CR), rather than on the actual amount of information transmitted and on how long the connections are established.

Therefore, just mere estimations of the actual traffic can be made on the basis of the number of CR messages, rather than an accounting of the total amount of Connection-Oriented signalling exchanged between different operators. That is, operators can only make estimations based on the amount of detected CR messages registered to determine the real amount of traffic. To this end, said operators estimate the message and length averages that correspond to the specific traffic types and use cases.

SUMMARY OF THE INVENTION

As explained above, in telecommunication systems using connection-oriented services, for example connection-oriented services provided by the signalling connection control part (SCCP) of the Signalling System Number 7 (SS7), the accounting is merely based on counting the number of communication request messages (CR). Thus, in conventional connection-oriented telecommunication systems where one or more transit networks are used for routing communications, only estimations of the actual signalling traffic can be used for accounting purposes. Thus, in conventional connection-oriented telecommunication systems the accounting is very inaccurate.

Therefore, the object of the present invention is to provide an accounting method, an exchange and a telecommunication system by which more accurate measurements of the connection-oriented messages and the total amount of information transferred to and from transit networks can be obtained.

This object is solved by a method (claim 1) for cascade accounting of connection-oriented communication sessions each being maintained between a first and a second subscriber station of a telecommunication system operating with connection-oriented services and comprising the sending of forward signalling messages in the direction from said first subscriber station to said second subscriber station and backward signalling messages in the direction from said second subscriber station to said first subscriber station through said telecommunication system which includes:

- a first network serving a plurality of said first subscribers stations and including at least one first exchange having a plurality of outgoing communication resources for transmitting forward signalling messages and for receiving backward signalling messages;
- at least one transit network including at least one transit exchange having a plurality of incoming communication resources for receiving forward signalling messages and for transmitting backward signalling messages and a plurality of outgoing communication resources for transmitting forward signalling messages and for receiving backward signalling messages; and
- a second network serving a plurality of said second subscribers stations and including at least one second exchange having a plurality of incoming communication resources for receiving forward signalling messages and for transmitting backward signalling messages, and
- wherein all signalling messages belonging to the same communication session are processed along the same path through the respective exchanges by the same incoming communication resource and the same outgoing communication resource of the respective exchanges involved in the communication session, comprising the following steps:
a) storing in each outgoing communication resource for a respective communication session
  a1) a verification accounting reference parameter indicating a verification accounting means for measuring the respective signalling traffic amount of the transmitted forward signalling messages; and
  a2) a remuneration accounting reference parameter indicating a remuneration accounting means for measuring the respective signalling traffic amount of received backward signalling messages;
b) storing in each incoming communication resource during said communication session
  b1) a remuneration accounting reference parameter indicating a remuneration accounting means for measuring the respective signalling traffic amount of received forward signalling messages; and
  b2) a verification accounting reference parameter indicating a verification accounting means for measuring the respective signalling traffic amount of the transmitted backward signalling messages of said communication session;
c1) accounting of all forward signalling messages belonging to the same communication session by measuring the signalling traffic of said forward signalling messages by the respective verification accounting means as indicated via said verification accounting reference parameter in the respective outgoing communication resource and by the respective remuneration accounting means indicated via said remuneration accounting reference parameter in the respective incoming communication resource; and
c2) accounting of all backward signalling messages belonging to the same communication session by measuring the signalling traffic of said backward signalling messages by the respective remuneration accounting means indicated via said remuneration accounting reference parameter in the respective outgoing communication resource and by the respective verification accounting means indicated via said verification accounting reference parameter in the respective incoming communication resource.

Furthermore, this object is solved by an exchange (claim 16) of a telecommunication system in which connection-oriented communication sessions are respectively maintained between a first and a second subscriber station of a telecommunication system operating with connection-oriented services by sending forward signalling messages in the direction from said first subscriber station to said second subscriber station and backward signalling messages in the direction from said second subscriber station to said first subscriber station through said telecommunication system, including:

switching means for switching said signalling messages, including:
  a plurality of outgoing communication resources for transmitting forward signalling messages and for receiving backward signalling messages;
  a plurality of incoming communication resources for receiving forward signalling messages and for transmitting backward signalling messages; wherein
  all signalling messages belonging to the same communication session are processed in the exchange by the same incoming communication resource and/or the same outgoing communication resource; and
an accounting means for cascade accounting of said connection-oriented communication sessions, including:
  a plurality of first verification accounting means for measuring the signalling traffic amount of forward signalling messages transmitted by a respective outgoing communication resource;
  a plurality of first remuneration accounting means for measuring the signalling traffic amount of forward signalling messages received by a respective incoming communication resource;
  a plurality of second remuneration accounting means for measuring the signalling traffic amount of backward signalling messages received by a respective outgoing communication resource; and
  a plurality of second verification accounting means for measuring the signalling traffic amount of backward signalling messages transmitted by a respective incoming communication resource;
  memory means in each outgoing communication resource for storing a verification accounting reference parameter indicating one of said first verification accounting means and a remuneration accounting reference parameter indicating one of said second remuneration accounting means;
  memory means in each incoming communication resource for storing a remuneration accounting reference parameter indicating one of said first remuneration accounting means and a verification accounting reference parameter indicating one of said second verification accounting means;

wherein at every transmission of a forward signalling message from said outgoing communication resource, the verification accounting means indicated in said outgoing communication resource via said verification accounting reference parameter measures the signalling traffic of said transmitted forward signalling message;

wherein at every reception of a backward signalling message at said outgoing communication resource the remuneration accounting means indicated in said outgoing communication resource via said remuneration accounting reference parameter measures the signalling traffic of said received backward signalling message;

wherein at every reception of a forward signalling message at said incoming communication resource the remuneration accounting means indicated in said incoming communication resource via said remuneration accounting reference parameter measures the signalling traffic of said received forward signalling message;

wherein at every transmission of a backward signalling message at said incoming communication resource the verification accounting means indicated in said incoming communication resource via said verification accounting reference parameter measures the signalling traffic of said backward signalling message.

Furthermore, this object is solved by telecommunication system (claim 18) operating with connection-oriented services where communication sessions between a first and a second subscriber station are maintained by sending forward signalling messages in the direction from said first subscriber station to said second subscriber station and backward signalling messages in the direction from said second subscriber station to said first subscriber station through said telecommunication system, comprising:

a first network serving a plurality of said first subscribers stations and including at least one first exchange having a plurality of outgoing communication resources for transmitting forward signalling messages and for receiving backward signalling messages;

at least one transit network including at least one transit exchange having a plurality of incoming communication resources for receiving forward signalling messages and for transmitting backward signalling messages and a plurality of outgoing communication resources for transmitting forward signalling messages and for receiving backward signalling messages; and a second network serving a plurality of said second subscribers stations and including at least one second exchange having a plurality of incoming communication resources for receiving forward signalling messages and for transmitting backward signalling messages; and wherein each exchange is constituted as defined above.

In accordance with the invention, each outgoing communication resource contains for each communication session, a session-specific verification accounting reference parameter for measuring transmitted forward signalling message traffic and a session-specific remuneration accounting reference parameter for measuring received backward signalling message traffic. Further, in accordance with the invention, the incoming communication resource contains a session-specific remuneration accounting reference parameter for measuring the received forward signalling message traffic and a verification accounting reference parameter allowing the measurement of transmitted backward signalling message traffic. The respective accounting references point to a communication-specific accounting means which then performs the actual measurement of the traffic. Thus, whenever the same communication-session between a specific first subscriber station and a specific second subscriber station is established, always the same accounting references will be used and thus the same accounting means will account for the signalling traffic, even if a further individual communication-session between the first and second subscriber station will use a different path through the networks and thus through different incoming and outgoing communication resources. The reason is that for each subsequent call message the same accounting references will be encountered as those which were determined during the initial determination of accounting references (e.g. with the request and confirmation messages) and which were stored in the seized communication resources (incoming & outgoing).

Since each incoming communication resource and each outgoing communication resource will respectively have stored therein a verification accounting reference parameter as well as a remuneration accounting reference parameter, a more accurate accounting can be achieved because all connection-oriented messages can be controlled and registered for accounting purposes.

Thus (claim 2) whenever a forward signalling message is transmitted from an outgoing communication resource the following steps are carried out: accessing said outgoing communication resource during a communication session, reading out the verification accounting reference parameter stored therein, invoking the verification accounting means indicated by said read-out verification accounting reference parameter, and measuring the signalling traffic of said transmitted forward signalling message by said invoked verification accounting means; and whenever a forward signalling message is received by an incoming communication resource, the following steps are carried out: accessing said incoming communication resource, reading out the remuneration accounting reference parameter stored therein, invoking the remuneration accounting means indicated by said read-out remuneration accounting reference parameter, and measuring the signalling traffic of said received forward signalling message by said invoked remuneration accounting means; and whenever a backward signalling message is transmitted by said incoming communication resource, the following steps are carried out: accessing said incoming communication resource, reading out the verification accounting reference parameter stored therein, invoking said verification accounting means indicated by said read-out verification accounting reference parameter and measuring the signalling traffic of the transmitted backward signalling message by said verification accounting means; and whenever a backward signalling message is received by an outgoing communication resource, the following steps are carried out: accessing said outgoing communication resource, reading out the remuneration accounting reference parameter stored therein, invoking the remuneration accounting means indicated by said read-out remuneration accounting reference parameter, and measuring the signalling traffic of the received backward signalling message by said invoked remuneration accounting means.

Preferably, (claims 3–7), in accordance with an embodiment of the invention, each exchange can comprise an accounting memory in which a plurality of accounting parameter sets are formed. These accounting parameter sets comprise a predetermined number of parameters, namely the so-called accounting criteria. Whenever a connection-oriented signalling message is transmitted or received by a respective communication resource, a communication parameter set is derived on the basis of identifications indicating the originating and target communication resource of the signalling message, and this communication parameter set is compared with the accounting parameter sets stored in the exchange. The accounting parameter sets also comprise an indication of a verification or remuneration accounting reference parameter and the specific accounting reference parameters, in the accounting parameter set whose parameters match the derived communication parameter set, is read out and stored in the corresponding incoming or outgoing communication resource. Thus, all connection-oriented messages which match applicable accounting criteria can be controlled and registered with a negligible impact and performance.

Whilst other techniques for allocating the appropriate verification and accounting reference parameters may be used, preferably (claims 7–9), a first setting (determination) of the appropriate verification and remuneration accounting parameters in the respective incoming and outgoing communication resources is made when the first communication request message is sent from the exchange of the first network to the exchange of the second network through the one or more transmit networks and and a second setting is made when a communication confirmation backward signalling message is returned in response thereto by the second network to the first network again through the relevant transit networks. Thus, only the initial messages for setting up communications, namely the communication request message and the corresponding successful communication confirmation messages are analysed versus the defined counting criteria. Provided that the relevant communication related data (i.e. the communication parameter sets which are derived in the exchange) match an accounting criteria, the communication request and communication confirmation messages per individual communication-session can be registered for accounting purposes.

Since the accounting parameter sets stay the same even after the completion of the communication request and communication confirmation message exchange, all subsequent connection-oriented messages containing payload information can also undergo the communication parameter set determination and can find a match with the relevant accounting parameter set. Since the accounting reference parameter in the matched accounting parameter set stays the same, also the subsequent payload connection-oriented messages will be accounted for by the accounting means indicated by the accounting reference parameters. Thus, all subsequent connection-oriented messages transmitted during the communication-session (and also during a new communication-session) can be easily registered for accounting purposes.

Preferably (claim 12–15), but not exclusively, the present invention provides more accurate accounting of connection-oriented services and signalling messages which are provided by the Signalling Connection Control Part SCCP of the Signalling System Number 7 (SS7). Whilst in the SCCP SS7 telecommunication system the incoming communication resource is a SCCP SS7 Incoming Connection Section IncS, said outgoing communication resource is a SCCP SS7 outgoing connection section OutCs, said forward signalling messages comprise a SCCP SS7 communication request message, a data form 1 message, a data form 2 message, a Release Complete (RLC) message and a SCCP SS7 released (RLSD) message, said backward signalling messages comprise a SCCP SS7 communication confirm message, a Data Form 1 message, a Data Form 2 message, a release complete message (RLC) and a released message (RLSD). Corresponding communication resources and signalling messages which serve similar purposes can be found in other telecommunication systems. Therefore, the present invention should not be seen as being restricted to the SCCP SS7 telecommunication systems.

Furthermore, it should be understood that the present invention is not limited by the disclosure in the description and the claims. That is, further modifications and variations of the invention may be carried out on the basis of the teachings disclosed herein. Furthermore, the present invention may comprise embodiments which consist of steps and/or features which have been described independently in the description and/or have been claimed independently in the claims.

Further advantageous embodiments and improvements of the invention may for example be found in the dependent claims. Hereinafter, the invention will be explained with reference to what the inventors presently conceive the best mode of the invention, as illustrated with the following embodiments and with reference to the attached drawings.

BRIEF DESCRIPTION OF THE DRAWINGS

FIG. 4b shows a principle block diagram of an exchange in accordance with the invention;

FIG. 4c shows a principle flow chart of the method in accordance with the invention for accounting connection-oriented messages;

FIGS. 9a–9j a detailed use case of accounting connection-oriented messages in accordance with an embodiment of the invention applied to a SCCP SS7 telecommunication system.

DETAILED DESCRIPTION OF THE INVENTION

Figure 1:
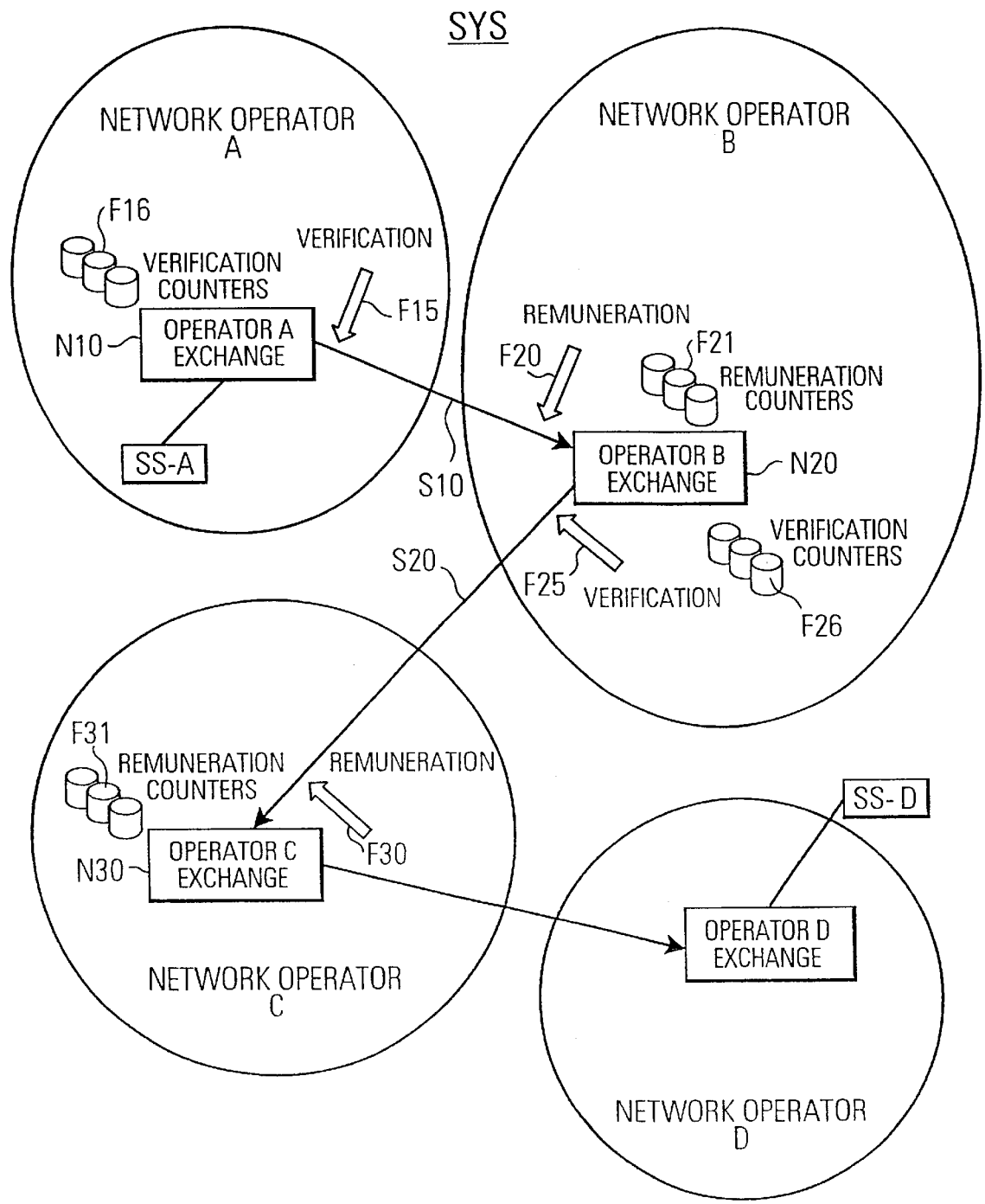
FIG. 1 represents a generic scenario of a conventional telecommunication system (SYS) with more than one transit network wherein an Accounting function, namely both Remuneration and Verification features, is used.
Figure 4A:
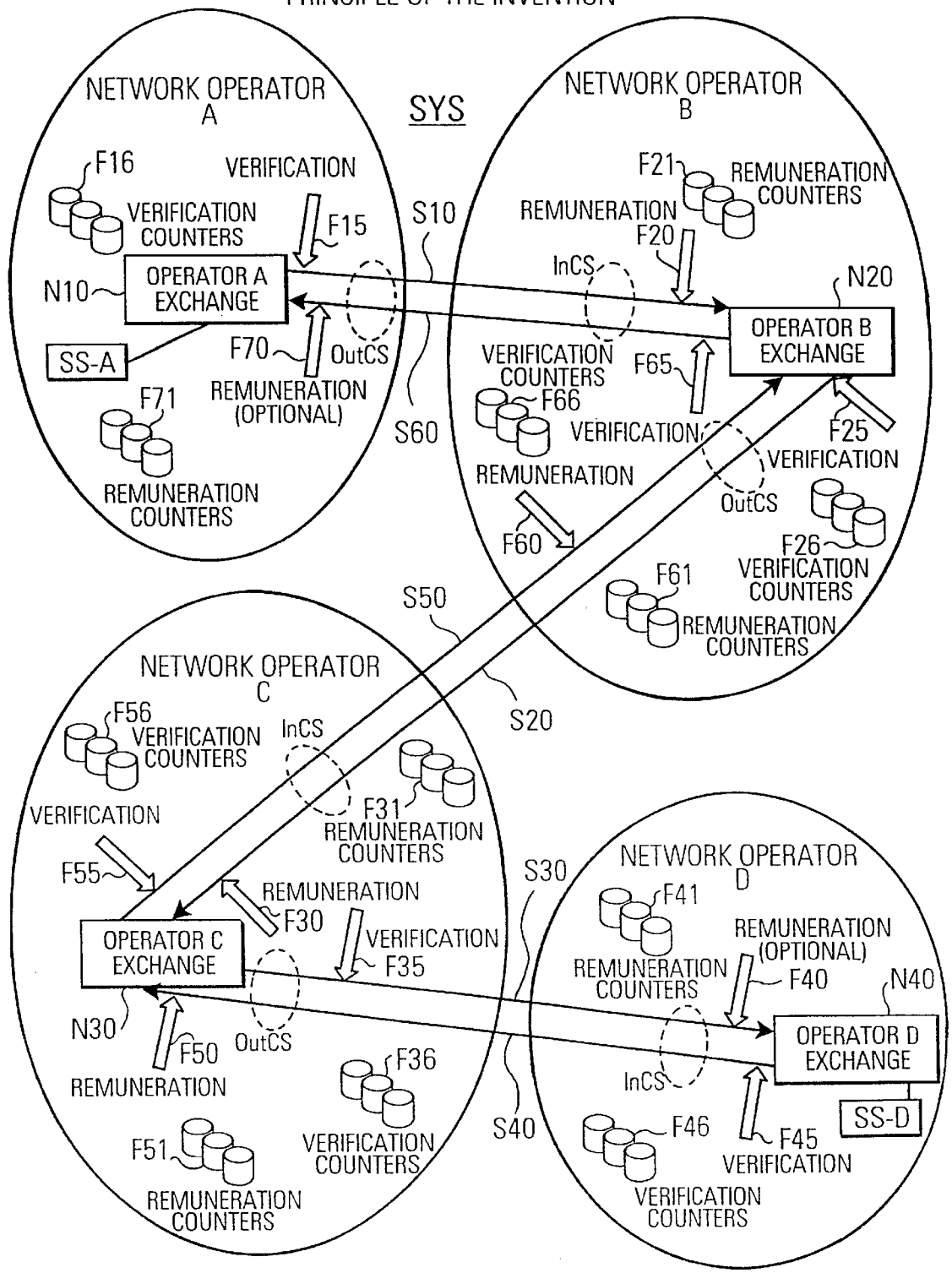
FIG. 4a shows an overview diagram of a telecommunication system in accordance with the invention.

FIG. 4a is an overview diagram of a telecommunication system SYS in accordance with the invention. As the telecommunication system SYS in FIG. 1, also the telecommunication system SYS in FIG. 4a comprises a first network (network operator A) with an exchange A, N10 for serving a plurality of first subscriber stations SS-A, two transit networks B, C each including a transit exchange B, N20; C, N30, and a second network D comprising a second exchange D, N40 serving a plurality of second subscriber stations SS-D. Although FIG. 4a shows two transit networks B, C, at least one transit network B or C is sufficient for explaining the concept of the invention. Furthermore, although not of further relevance for the invention, of course the transit exchanges B, C are also capable of serving subscriber stations.

Each exchange in the first network A, the transit networks B, C and the second network D comprises an exchange EX, as generally indicated in FIG. 4b. That is, FIG. 4b shows a principal block diagram of an exchange in accordance with the invention.

For the example case of a connection-oriented communication-session between the first subscriber station SS-A and the second subscriber station SS-D FIG. 4a also shows the sending of forward signalling messages S10, S20, S30 in a forward direction from the first subscriber station SS-A to said second subscriber station SS-D and backward signalling messages S40, S50, S60 in the direction from the second subscriber station SS-D to said first subscriber station SS-A through the transit networks B and C. The meaning of these signalling messages will be discussed below, however, it should be noted that also in FIG. 4b the arrows pointing to the right side in the drawing denote forward signalling messages, and the arrows pointing in the left direction denote backward signalling messages, similarly as in FIG. 4a.

Figure 2:
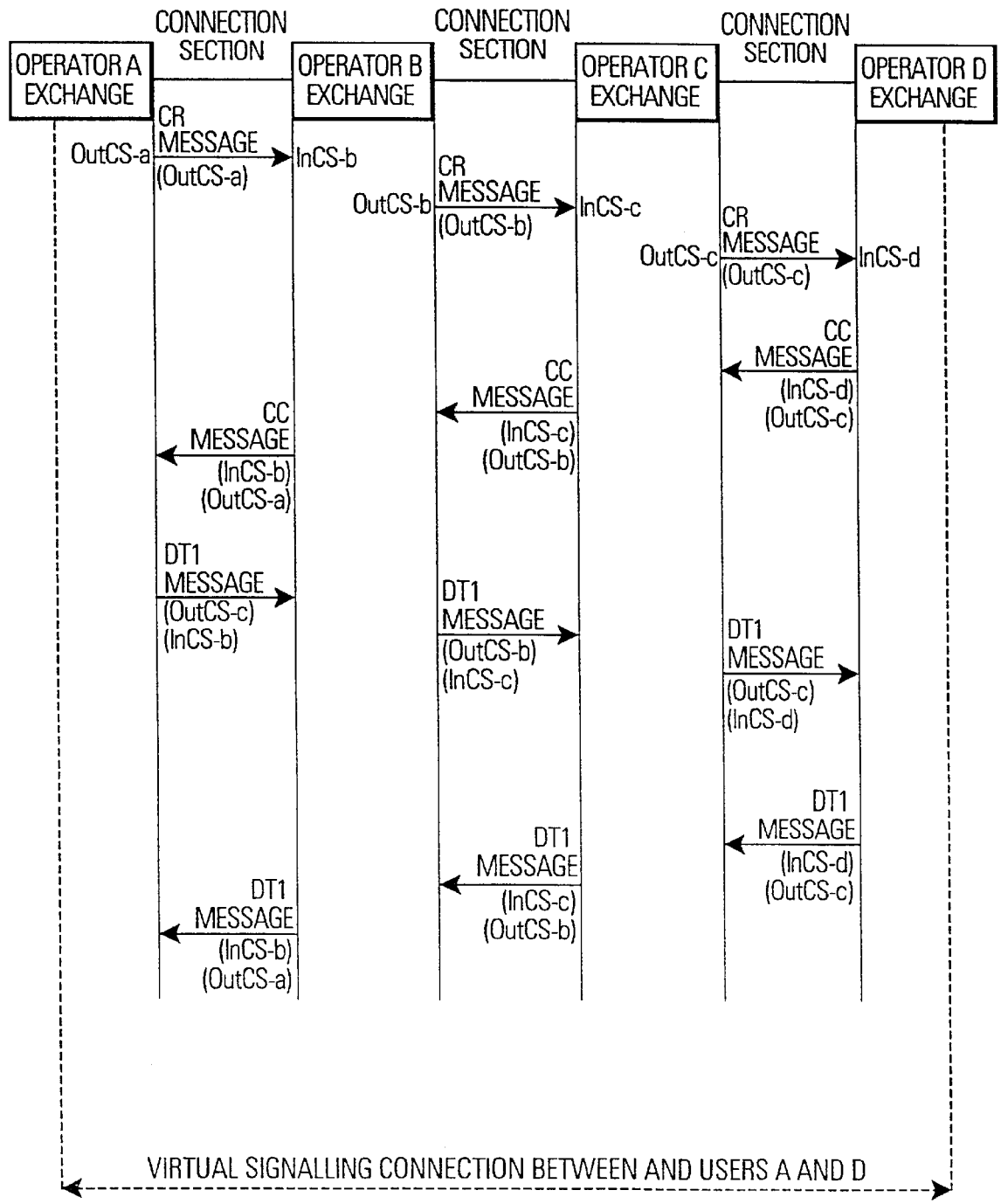
FIG. 2 shows how Connection Sections are seized and linked at reception and sending of CR and CC messages, as well as how these connection Sections are indicated to the adjacent node in terms of Source Local Reference and Destination Local Reference according to the prior art.
Figure 3A:
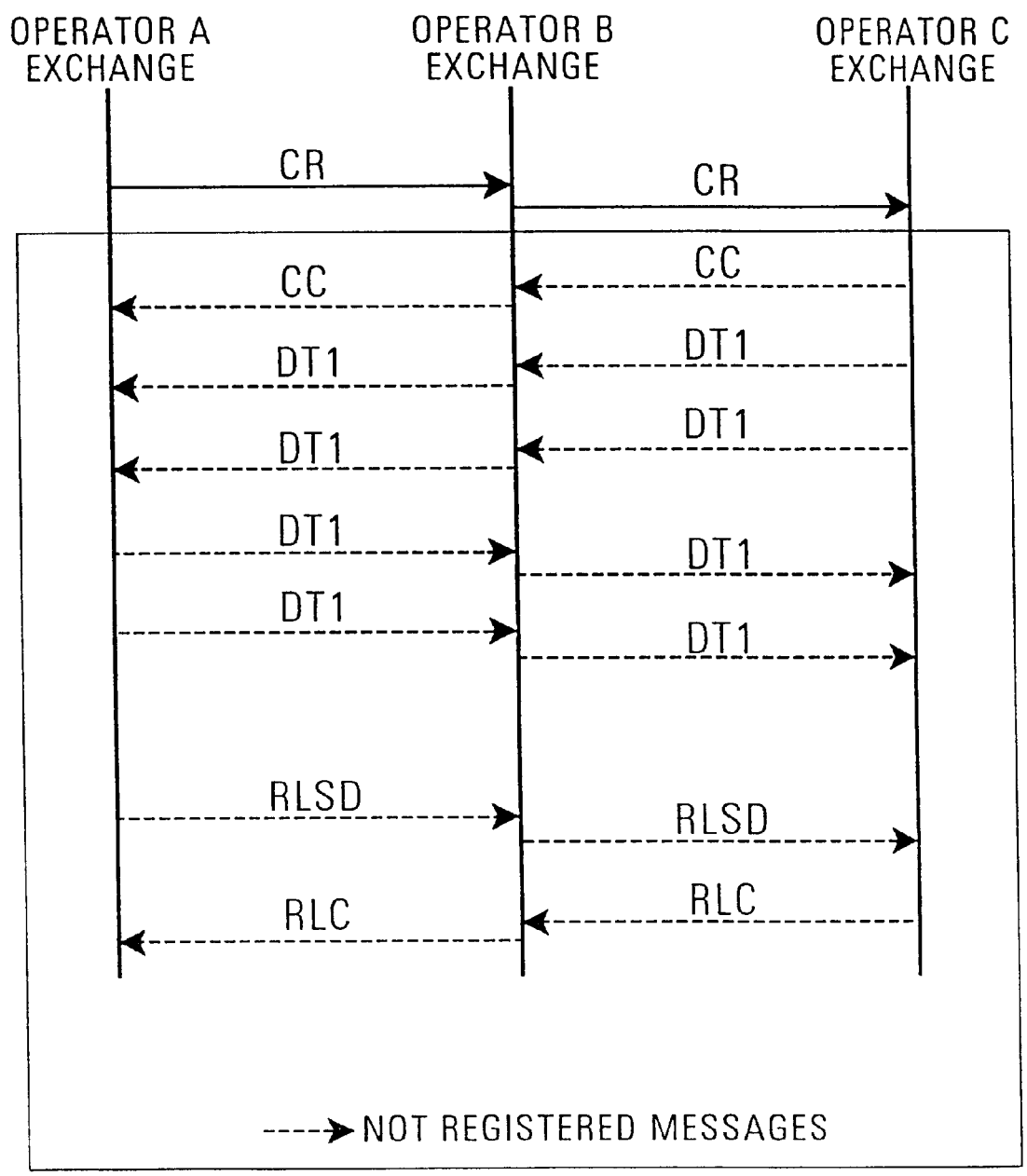
FIG. 3a schematically shows a generic example of Connection-Oriented signalling exchanged between two end users through another transit node wherein just one message, the Connection Request message, is taken into consideration for Accounting purposes, according to the prior art.
Figure 3B:
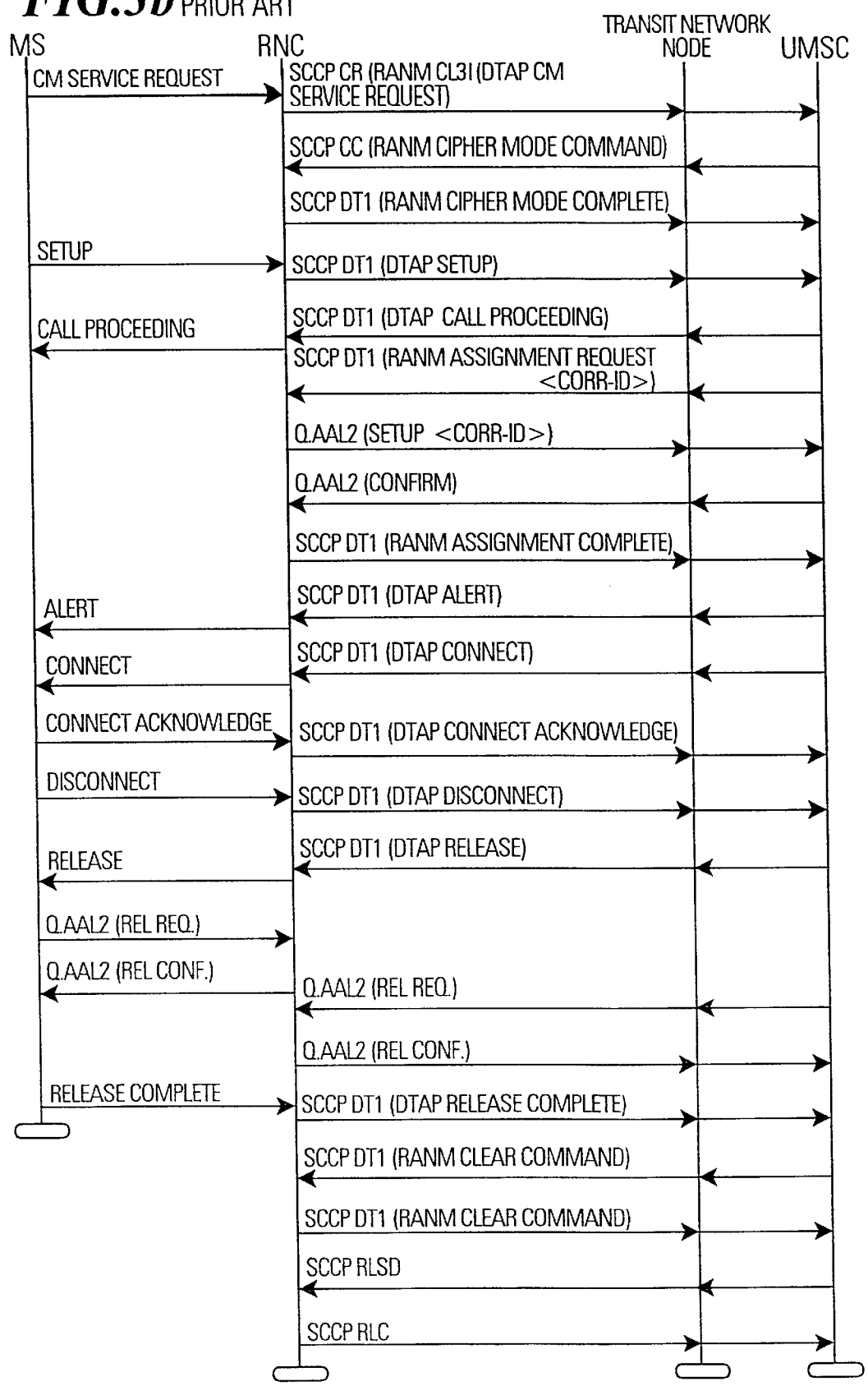
FIG. 3b basically represents the flow diagram corresponding to call establishment and release in a UMTS network, in particular, the SCCP Connection-Oriented signalling exchanged between the UMSC and RNC through a generic Transit network which requires an Accounting in the Transit network Node, according to the prior art.

As already explained with respect to FIG. 2 and FIG. 3a of the prior art, also the exchange EX in accordance with the invention and shown in FIG. 4b comprises a plurality of outgoing communication resources OutCS (OutCS1, OutCS2, . . . , OutCSi, . . . OutCS$_f$) for transmitting forward signalling messages FSM$_i$ and for receiving backward signalling messages BSM$_i$. If the exchange EX in FIG. 4b is arranged at node B, the forward signalling message FSM$_i$ is the signalling traffic S20 and the backward signalling message BSM$_i$ is the backward signalling traffic S50 shown in FIG. 4a.

Furthermore, the exchange EX comprises a plurality of incoming communication resources InCS (InCS1, InCS2, . . . , InCSj, . . . , InCS$_r$) for receiving forward signalling messages FSM$_j$ and for transmitting backward signalling messages BSM$_j$. If the exchange EX is arranged at node B, the forward signalling message FSM$_j$ is the forward signalling traffic S10, and the backward signalling message BSM$_j$ is the backward signalling traffic S60 shown in FIG. 4a. The outgoing and incoming communication resources are for example constituted by the outgoing connection sections and incoming connection sections in a SCCP SS7 communication system.

Of course, if the network exchange A of the first network A is only arranged for transmitting and receiving signalling messages to/from the network exchange B, the exchange EX of the first network A may only comprise the outgoing communication resources. Similarly, if the network exchange D of the second network D is only arranged for receiving and transmitting signalling messages to/from the network exchange C, the exchange EX of the second network D may only comprise the incoming communication resources.

As already explained with reference to FIG. 2, internally of the exchange EX a switching means SW is provided for switching the signalling messages, i.e. a connection between the incoming communication resource InCS and the outgoing communication resource OutCS is made. As also explained above, in a connection-oriented communication-session, all signalling messages belonging to the same communication-session are processed in the exchange by the same incoming communication resource and/or the same outgoing communication resource. For example, if a first communication-session between the subscriber station SS-A and the subscriber station SS-D uses a first plurality of incoming communication resources and first plurality of outgoing communication resources, when this communication-session is finished and a new communication-session again between the same first subscriber station SS-A and the second subscriber station SS-D is set up, then a different plurality of incoming communication resources and outgoing communication resources may be used. This will for example depend on the traffic conditions and the capabilities of the respective exchanges EX.

The exchange EX in accordance with the invention also comprises an accounting means ACC which includes a plurality of first verification accounting means VER1, a plurality of first remuneration accounting means REM1, a plurality of second remuneration accounting means REM2, a plurality of second verification accounting means VER2, memory means MEM-OutCS$_f$ in each outgoing communication resource and memory means MEM-InCS$_1$ in each incoming communication resource, as shown in FIG. 4b.

As can be seen from FIG. 4a in combination with FIG. 4b, the plurality of first verification accounting means F15, F16; F25, F26; F35, F36, VIR1 are adapted for measuring the signalling traffic amount S10; S20, S30 of forward signalling messages transmitted by a respective outgoing communication resource OutCS. The plurality of first remuneration accounting means F20, F21; F30, F31; F40, F41, REM1 are provided for measuring the signalling traffic amount S10; S20, S30 of forward signalling messages received by a respective incoming communication resource InCS.

Furthermore, the plurality of second remuneration accounting means F50, F51; F60, F61, F70, F71; REM2 are provided for measuring the signalling traffic amount S40; S50, S60 of backward signalling messages received by respective outgoing communication resource OutCS. The plurality of second verification accounting means F45, F46; F55, F56; F65, F66, VER2 are provided for measuring the signalling traffic amount S40; S50, S60 of backward signalling messages transmitted by a respective incoming communication resource InCS.

Each of the verification accounting means and remuneration accounting means may preferably be constituted by a plurality of counters. A preferred embodiment of an accounting means comprises a first counter for counting the number of messages and a second counter for counting the number octets contained in each respective message.

The memory means MEM-OutCS$_i$ in each outgoing communication resource OutCS stores a verification accounting reference parameter VerACCref indicating one of said first verification accounting means and a remuneration accounting reference parameter RemACCRef indicating one of said second remuneration accounting means. Similarly, as also shown in FIG. 4b, each memory means MEM-InCS$_1$ in each incoming communication resource InCS stores a remuneration accounting reference parameter RemACCRef indicating one of said first remuneration accounting means and a verification accounting reference parameter VerACCref indicating one of said second verification accounting means.

The manner how the individual verification accounting reference parameters and remuneration accounting reference parameters are determined and set in the respective incoming communication resources and outgoing communication resources, will hereinafter be explained with reference to FIG. 4c and FIG. 4d. However, it can already be seen at this stage, by comparing FIGS. 4a, 4b with FIG. 1, that the provision of the verification accounting reference parameters and remuneration accounting reference parameters pointing to predetermined accounting means in each incoming communication resource and each outgoing communication resource for the forward signalling messages as well as backward signalling messages, allow a more accurate accounting because both the forward and backward signalling messages at both the incoming and outgoing communication resources will be accounted for. That is, at every transmission of a forward signalling message form the outgoing communication resource OutCS, the verification accounting means indicated in the outgoing communication resource OutCS via the verification accounting reference parameter measures the signalling traffic of the transmitted forward signalling message FSM$_i$.

At every reception of a backward signalling message at said outgoing communication resource OutCS, the remuneration accounting means indicated in said outgoing communication resource OutCS via the remuneration accounting reference parameter measures the signalling traffic of the received backward signalling message BSM$_i$.

Furthermore, at every reception of a forward signalling message at said incoming communication resource InCS, the remuneration accounting means indicated in said incoming communication resource InCS via said remuneration accounting reference parameter measures the signalling traffic of the received forward signalling message FSM$_j$. Furthermore, at every transmission of a backward signalling message at said incoming resource InCS the verification accounting means indicated in said incoming communication resource InCS via said verification accounting reference parameter measures the signalling traffic of the transmitted backward signalling message BSM$_j$.

Thus, in accordance with the invention, the respective accounting means perform a remuneration and verification accounting for each message transmitted or received by a respective communication resource. Therefore, by contrast to what has been described with reference to FIG. 1, the present invention does not account only for set-up messages like forward communication set-up request messages but allows an accounting of all signalling messages used in the connection-oriented communication-session, i.e. of the messages for establishing the communication between the first subscriber station SS-A and the second subscriber station SS-B as well as those messages which are transmitted/received during the communication. Thus, an accounting with high accuracy can be obtained. In accordance with the invention all forward signalling messages belonging to the same communication-session are accounted for by measuring the signalling traffic of said forward signalling messages by the respective verification accounting means, as indicated via said verification accounting reference parameter in the respective outgoing communication resource and by the respective remuneration accounting means indicated via said remuneration accounting reference parameter in the respective incoming communication resource. Additionally, all backward signalling messages belonging to the same communication-session are accounted for by measuring the signalling traffic of the backward signalling messages by the respective remuneration accounting means indicated via said remuneration accounting reference parameter in the respective outgoing communication resource, and by the respective verification accounting means indicated via said verification accounting reference parameter in the respective incoming communication resource. Thus, in accordance with the invention, all the signalling messages in the forward and backward direction from the first exchange to the second exchange through the transit exchanges can be accounted for. Thus, a real account of the actual signalling traffic can be provided and an accurate accounting is achieved.

In accordance with the invention, the storing of the respective remuneration accounting reference parameters and verification accounting reference parameters allows the aforementioned more accurate accounting with the respective verification accounting means and remuneration accounting means. Of course, during the initial set-up of the connection-oriented communication such accounting reference parameters will as yet not have been stored in the respective incoming and outgoing communication sections. As will be understood below, from a detailed description of the method in accordance with an embodiment of the invention, preferably the accounting reference parameters are set during the first exchange of communication request messages and communication confirmation messages during the call set-up between the first subscriber station SS-A and the second subscriber station SS-D.

First Embodiment (Cascade Accounting)

FIG. 4c shows a principal flowchart of the method in accordance with the invention for cascade accounting of connection-oriented signalling messages. The method comprises a step S1 for storing in each outgoing communication resource OutCS for a respective communication-session a verification accounting reference parameter VerACCref indicating a verification accounting means F15, F16; F25, F26, F35, F36 for measuring the respective signalling traffic amount of transmitted forward signalling messages FSM$_i$ and a remuneration accounting reference parameter RemACCRef indicating a remuneration accounting means F50, F51; F60, F61; F70, F71 for measuring the respective signalling traffic amount of received backward signalling messages $BSM_i$.

The method also comprises the step S2 for storing in each incoming communication resource InCS during said communication-session a remuneration accounting reference parameter RemACCRef indicating a remuneration accounting means F20, F21; F30, F31; F40, F41 for measuring the respective signalling traffic amount S10; S20, S30 of received forward signalling messages $FSM_j$ and a verification accounting reference parameter VerACCref indicating a verification accounting means F45, F46; F55, F56; F65, F66 for measuring the respective signalling traffic amount S40; S50; S60 of the transmitted backward signalling messages $BSM_j$ of the communication-session.

As already indicated above, the determination and storage of the accounting reference parameters may preferably be carried out during the communication set-up when request and request confirmation messages are exchanged. FIG. 4d shows a flowchart how the respective accounting parameters may be determined and stored.

As a prerequisite for carrying out the determination and storing of accounting reference parameters, in step S11 a plurality of accounting parameter sets are stored in an accounting parameter set memory APSD of the accounting means ACC (see FIG. 4b). An accounting parameter set comprises a plurality of communication parameters, for example an origin of the signalling message to be accounted for, a destination of the signalling message, an identification of the called subscriber station and a communication-class. Furthermore, each of the accounting parameter sets will contain a respective verification or remuneration accounting reference parameter indicating a specific remuneration or verification accounting means. Thus, the respective accounting parameter set comprises some communication-related parameters and a respective accounting reference parameter.

In step S12 a signalling message transmission from an incoming communication resource (a backward signalling message $BSM_j$) or from an outgoing communication resource (a forward signalling message $FSM_i$) is determined, or the receipt of a signalling message by the incoming communication resource (a forward signalling message $FSM_j$) or by the outgoing communication resource (a backward signalling message $BSM_i$) is determined. For the signalling message to be transmitted or the signalling message received a forward communication parameter set or a backward communication parameter set, depending on the direction of the signalling message, is derived in step S13. The communication-related parameters which are extracted from the signalling message (to be transmitted or received) can again comprise communication parameters like the source and destination of the signalling message and/or other communication-related parameters.

In step S14 the respectively extracted forward communication parameter set or backward communication parameter set is compared with the plurality of accounting parameter sets stored in the memory APSD of the accounting means ACC. If in step S14 a match is found between the communication parameter set and one of the accounting parameter sets, then the respectively stored accounting reference parameter is read from the matching accounting parameter set in step S15. In step S16 the read out accounting reference parameter is stored in the incoming communication resource memory $MEM\text{-}InCS_1$ or the outgoing communication resource memory $MEM\text{-}OutCS_j$, as indicated in FIG. 4b.

Thus, as indicated in FIG. 4b, after having provided the matching for the respective forward and backward signalling messages, each of the memories in the incoming communication resources and outgoing communication resources will have stored a corresponding verification accounting reference parameter VerACCref and a remuneration accounting parameter RemACCRef. Therefore, by means of these accounting reference parameters any further signalling message of the communication-session being transmitted or received thereafter can be accounted for with the accounting means indicated by the respective accounting reference parameter.

Since every further signalling message (forward or backward, transmitted or received) of the same communication-session will have the same characteristics, e.g. the same source and destination characteristics etc., the same accounting references (as were previously stored in the incoming and outgoing communication resources) are used for the accounting of the further messages. This is so because with every source and destination indication in the further signalling messages belonging to the same connection-oriented call, the same incoming and outgoing communication resource (as previously defined and stored) is determined on the basis of the destination or source identification in the further signalling message, e.g. by setting the number of the incoming or outgoing communication resource to the number of the destination or source identification.

As will be explained below, whenever a new signalling message arrives after step S16, for each new signalling message to be transmitted or received again a special communication-parameter set is derived, and the accounting reference contained in the incoming or outgoing communication resource indicated by the destination or source information of this communication parameter set is determined. Thus, every subsequently handled signalling message of the same communication-session will be accounted with the same verification accounting parameter means and remuneration accounting parameter means, as indicated with the respective accounting reference parameters in the respective incoming communication resource and outgoing communication resource.

This is possible, because each subsequently arriving signalling message of the same communication-session is processed along the same path through the respective exchanges by the same incoming communication resources and the same outgoing communication resources as the previously used signalling messages for identifying and storing the accounting reference parameters. Therefore, if a newly arriving signalling message belongs to the same communication-session, the same incoming or outgoing communication resource will be identified, and thus the same verification and remuneration accounting means stored in the outgoing and incoming communication resources as e.g. indicated by the source and destination information will be used.

Such a procedure is necessary, because it is necessary that the remuneration and verification accounting reference parameters always point to the same verification or remuneration accounting means (set of counters) also when a new communication-session between the same first and second subscriber stations is set up. That is, whilst different incoming and outgoing communication resources may be used between a first communication-session and another subsequent second communication-session between the first and second subscriber stations, for example depending on the traffic load in the resources and exchanges, still the same verification and remuneration accounting means will be used, because even if different incoming and outgoing communication resources are used, the remuneration and verification accounting reference parameter will be the same in each communication-session because the extracted forward or backward communication parameter set (derived in step S13) will in both communication-sessions find a match with the same accounting parameter set which contains the same pointer (accounting reference parameter). Thus, even when a new communication-session between the first and second subscriber stations is set up through a different set of incoming communication resources and outgoing communication resources, the same set of remuneration and verification accounting means will be used such that a communication-session-specific accounting is possible. Thus, the transit network cannot only charge the first and second network correctly for all the signalling traffic, forward and backward, handled by the transit network, but it can also do so on an individual communication-specific basis.

Figure 4D:
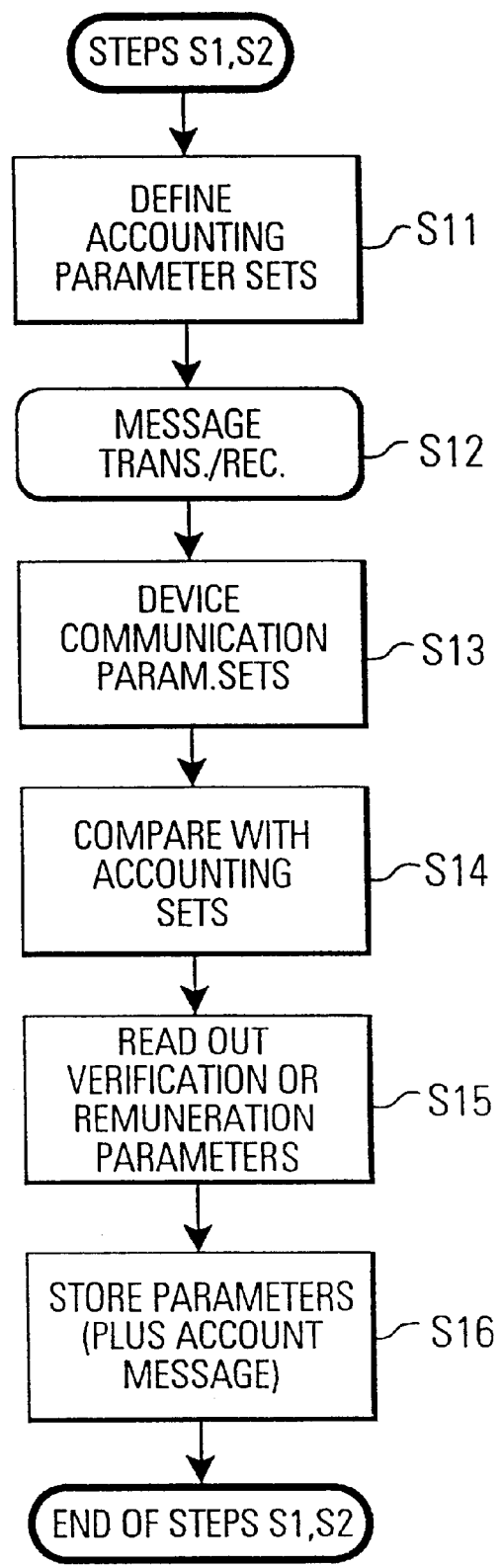
FIG. 4d shows a flow chart in accordance with the invention for determining verification and remuneration reference parameters in steps S1, S2.

Whilst FIG. 4d shows in combination the individual same steps for forward and backward signalling messages in both the incoming and outgoing communication resources, hereinafter, a more specific description of how the verification and remuneration accounting reference parameters are stored and determined in both the incoming communication resources and outgoing communication resources.

In particular, when a verification accounting reference parameter VerACCref is to be stored in an outgoing communication resource OutCS, the steps in FIG. 4d comprise the steps of determining, when a forward signalling message to open a connection CR is transmitted from said outgoing communication resource, a forward communication parameter set DPC, GT, SSN, PCLASS for said signalling message; comparing this forward communication parameter set with a plurality of predefined accounting parameter sets DPC, GT, SSN, PCLASS, VerACCref each containing a respective verification accounting reference parameter indicating a forward verification accounting means; and when a match is found between the parameter sets, reading out the verification accounting reference parameter VerACCref from said matching predefined accounting parameter set.

Furthermore, if a verification accounting reference parameter VerACCref is to be stored in an incoming communication resource InCS, steps S11–S16 in FIG. 4d comprise the steps of determining, when a backward signalling message CC is transmitted from said incoming communication resource, a backward communication parameter set OPC, GT, SSN, PCLASS; comparing this backward communication parameter set with a plurality of accounting parameter sets OPC, GT, SSN, PCLASS, VerACCref each containing a verification accounting reference parameter VerACCref indicating a backward verification accounting means; when a match between the parameter sets is found, reading out said verification accounting reference parameter from said matching predefined accounting parameter set.

Furthermore, if a remuneration accounting reference parameter RemACCref is to be stored in an incoming communication resource InCS, steps S11–S16 in FIG. 4d comprise the steps of determining, when a forward signalling message issued to open the connection CR is received by said incoming communication resource InCS, a forward communication parameter set OPC, GT, SSN, PCLASS; comparing said forward communication parameter set with a plurality of predefined accounting parameter sets (OPC, GT, SSN, PCLASS) each containing a respective remuneration accounting reference parameter RemACCref indicating a forward remuneration accounting means; and when a match is found between the parameter sets, reading out said remuneration accounting reference RemACCref parameter from said matching predefined accounting parameter set.

Finally, if a remuneration accounting reference parameter RemACCref is to be stored in an outgoing communication resource OutCS, steps S11–S16 comprise the steps of determining, when a backward signalling message issued to confirm the connection CC is received in said outgoing communication resource OutCS, a backward communication parameter set OPC, GT, SSN, PCLASS; comparing this backward communication parameter set with a plurality of predefined backward communication accounting parameter sets (OPC, GT, SSN, PCLASS, RemACCref each containing a remuneration accounting reference parameter RemACCref indicating a backward remuneration accounting means; when a match is found between said parameter sets, reading out the remuneration accounting reference parameter RemACCref from the matching predefined backward communication accounting parameter set.

Furthermore, as is indicated in step S16, also the forward and backward signalling message which are used for determining the actual verification and remuneration accounting references can immediately be accounted for by the accounting means indicated by the reference parameter. That is, FIG. 4d is most likely to be carried out during the initial exchange of communication request messages and communication confirmation messages sent from the first network to the second network and from the second network to the first network, respectively. Once, the respective accounting means has been determined via the reference parameter, it is clear that also these communication request messages and communication confirmation messages can be accounted for by the respective accounting means.

Therefore, as explained above, the procedure in FIG. 4d is preferably carried out when an exchange A of the first network received a communication set-up request from the first subscriber station SS-A, in which case the forward signalling message is a communication request message CR issue by the exchange A of the first network, and the backward signalling message is the expected or corresponding communication confirmation message CC issued by the exchange D of the second network serving the second subscriber station to which the communication set-up is requested by the first subscriber station. Thus, the verification accounting reference parameter VerACCref for each outgoing communication resource OutCS and the remuneration accounting reference parameter RemACCref for each incoming communication resource InCS is determined and stored in each respective communication resource when the communication request message CR is sent from the exchange A of the first network to the exchange D of the second network through the respective transit exchange B, C of each transit network.

Likewise, the verification accounting reference parameter VerACCref for each incoming communication resource InCS and said remuneration accounting reference parameter RemACCref for each outgoing communication resource OutCS is determined, when the second exchange D serving the second subscriber station SS-D in the second network sends back, in response to receiving said communication request message CR, the expected communication confirmation message CC to said first exchange A of said first network through the respective exchange C, B of the at least one transit network.

However, whilst it should be understood that the use of the communication request message CR and the communication confirmation message CC are a preferred embodiment of the invention for setting the respective accounting reference parameters, it may also be possible to use other signalling message for the initial set-up of the accounting reference parameters in each incoming and outgoing communication resource. For example, if the transit exchange decides to not perform any charging for the communication set-up messages such as CR and CC, a similar procedure for setting up the accounting references may be carried out by using other signalling messages of the communication-session. Therefore, the setting of the remuneration and verification accounting reference parameters is not limited to the use of the request and confirmation messages.

Hereinafter, with reference to steps S3–S10 in FIG. 4c, the accounting of forward and backward signalling messages will be described, assuming that the accounting reference determination and storage, e.g. with CR and CC messages (plus an accounting of them) has already been carried out in the preliminary steps S1, S2.

In step S3 a signalling message transmission or receipt is determined, and in step S4 it is determined whether the signalling message is to be handled by an incoming or outgoing communication resource.

If an incoming communication resource is determined in step S4, then in step S5a it is determined whether the signalling message is a forward or backward signalling message. If a backward signalling message is determined in step S5a, i.e. the incoming communication resource transmits a signalling message $BSM_j$ in the backward direction (see FIG. 4b), then in step S6a the corresponding verification accounting reference parameter VerACCRef is read by the read means RD, and in step S8a the backward signalling message is transmitted and accounted with the corresponding verification accounting means VER2 indicated by the verification accounting reference. This is indicated with the verification accounting reference VerACCRef=777 in the incoming communication resource $InCS_1$ in FIG. 4b. If in step S5a a forward signalling message is determined, i.e. the receipt of a forward signalling message $FSM_j$, as shown in FIG. 4b, then in step S7a the corresponding remuneration accounting reference, e.g. 109, is read and the forward signalling message is received and accounted for with the remuneration accounting means REM1 in step S9a.

If, alternatively, in step S4 an outgoing communication resource is determined, then in step S5b it is determined whether a forward signalling message or a backward signalling message is to be handled.

If in step S5b a backward signalling message is determined, i.e. the receipt of a backward signalling message $BSM_j$, as shown in FIG. 4b, then the corresponding remuneration accounting reference RemACCRef, e.g. 444, is read out in step S6b, and the backward signalling message is received and accounted for with the remuneration accounting means REM2 indicated by the remuneration accounting reference 444 (see FIG. 4b).

If in step S5b a forward signalling message is determined, i.e. that the transmission of a forward signalling message $FSM_i$ is to be carried out, then in step S7b the corresponding verification accounting reference VerACCRef, e.g. 513, is read out from the outgoing communication resource, and the forward signalling message $FSM_i$ is transmitted and accounted for with the verification accounting means VER1 (see FIG. 4b).

In step S10 it is determined whether a further forward or backward signalling message needs to be accounted for, and the message loops back to step S3 if a next message needs to be accounted for. If there is no further signalling message, i.e. the communication-session is ended or released by a release message, the procedure comes to an end.

Therefore, the accounting of all forward signalling messages belonging to the same communication-session is carried out in such a manner that whenever a forward signalling message other than CR is transmitted S9b from an outgoing communication resource OutCS, there are carried out the steps of accessing S7b said outgoing communication resource OutCS during a communication session, reading out S7b the verification accounting reference parameter VerACCref stored therein, invoking the verification accounting means indicated by said read-out verification accounting reference parameter, and measuring S9b the signalling traffic of said transmitted forward signalling message by said invoked verification accounting means. Whenever a forward signalling message other than CR is received S9a by an incoming communication resource InCS, there are carried out the steps of accessing S7a said incoming communication resource InCS, reading out S7a the remuneration accounting reference parameter RemACCref stored therein, invoking the remuneration accounting means indicated by said read-out remuneration accounting reference parameter, and measuring S9a the signalling traffic of said received forward signalling message by said invoked remuneration accounting means.

On the other hand, the accounting of all backward signalling messages belonging to the same communication-session is carried out in such a manner that whenever a backward signalling message is transmitted S8a by said incoming communication resource InCS, there are carried out the steps of accessing S6a said incoming communication resource InCS, reading out S6a the verification accounting reference parameter VerACCref stored therein, invoking said verification accounting means indicated by said read-out verification accounting reference parameter and measuring S8a the signalling traffic of the transmitted backward signalling message by said verification accounting means; and whenever a backward signalling message is received S8b by an outgoing communication resource OutCS, there are carried out the steps of accessing said outgoing communication resource OutCS, reading out S6b the remuneration accounting reference parameter RemACCref stored therein, invoking the remuneration accounting means indicated by said read-out remuneration accounting reference parameter, and measuring S8b the signalling traffic of the received backward signalling message by said invoked remuneration accounting means.

As may be understood now from FIG. 4c, since in steps S1, S2 the relevant verification and remuneration accounting reference parameters have been stored for all forward and backward signalling message accounting in both the incoming communication resource and the outgoing communication resource, in steps S6a, S7a, S6b, S7b it is only necessary to read out the accounting reference parameters stored in the incoming or outgoing communication resource memory $MEM\text{-}InCS_1$ or $MEM\text{-}OutCS_j$, and the corresponding verification or remuneration accounting means Ver1, Rem1, Rem2, Ver2 can be addressed and therefore, after the initial set-up of these parameters in steps S1, S2, as explained above, all subsequently received forward and backward signalling messages in both the incoming and outgoing communication resources can be accounted for. This provides a major advantage by contrast to FIG. 1, where only the initial communication request message is accounted for and no further accounting of other connection-oriented messages except for the CR and the CSS messages can be performed. Thus, the present invention provides a superior advantage in a more accurate accounting of all signalling messages of the connection-oriented communication-session.

From the above description it should be understood that the verification and remuneration accounting reference parameters are only stored in the incoming and outgoing communication resources as long as the respective communication-session prevails, however, since each incoming and outgoing communication resource during each communication-session only handles the signalling messages of this communication-session, only the accounting reference parameters for this communication-session are stored in the resources.

However, if a further communication-session between the same first and second subscriber station is set up, the respective signalling messages will again contain the same characteristics such that the same communication parameter set (forward or backward communication parameter set) is derived during the communication set-up and confirmation, such that the matching with yet the same accounting parameter set can be achieved and thus for the same type of communication-session again exactly the same verification and remuneration accounting means will be selected.

A specific example of the procedure in FIG. 4c with respect to the determination and storage of the verification and accounting reference parameters, and with respect to the counting of the respective forward and backward signalling messages will hereinafter be explained for the case where the connection-oriented services are provided by the Signalling Connection Control Part SCCP of the Signalling System Number 7 SS7.

Second Embodiment (SCCP SS7 Messages)

If the connection-oriented services are provided by the SCCP SS7 system, then the incoming communication resources are SCCP SS7 incoming connection sections InCS and the outgoing communication resources are SCCP SS7 outgoing connection sections OutCS.

Furthermore, the forward signalling messages comprise a SCCP SS7 connection request message CR, a data-form 1 (DT1) message, a data-form 2 (DT2) message, a SCCP SS7 ReLeased (RLSD) message or a SCCP SS7 Release Complete (RLC) message.

The backward signalling messages comprise a SCCP SS7 connection confirmation (CC) message, a data-form 1 (DT1) message, a data-form 2 (DT2) message, a ReLease complete message (RLC) or a SCCP SS7 Released (RLSD) message.

Hereinafter, with reference to the SCCP SS7 signalling messages, FIG. 5 and FIG. 6 indicate the steps S16 shown in FIG. 4d for storing the respective forward and backward verification and remuneration accounting references in the incoming and outgoing communication sections.

Figure 6:
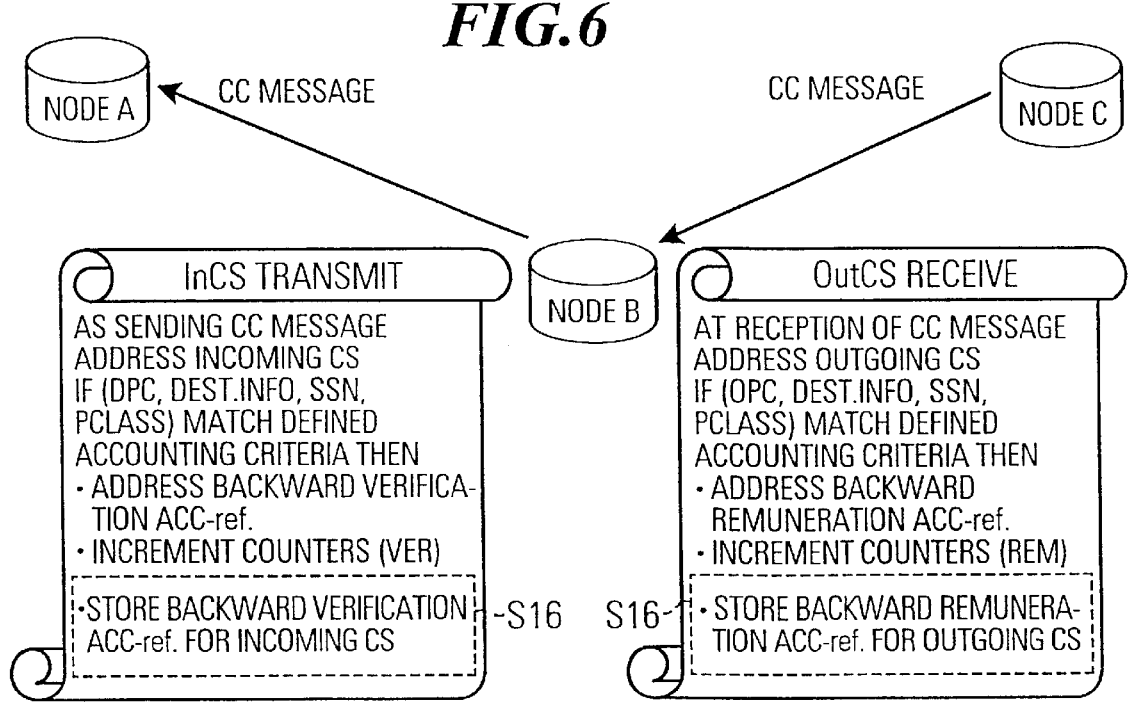
FIG. 6 basically presents the sequence of actions carried out at reception and transmission of CC messages in a Transit node B for Accounting purposes, showing framed in dashed lines the new actions according to the preferred embodiment of the present invention.
Figure 7:
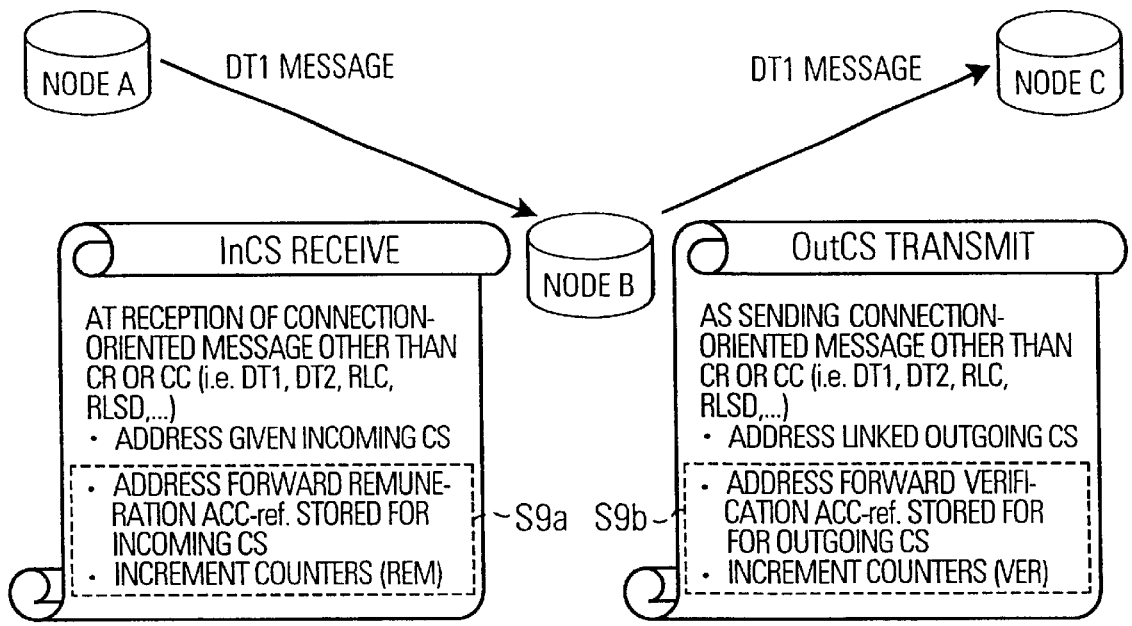
FIG. 7 basically presents the sequence of actions carried out at reception and transmission of Connection-Oriented messages other than CR or CC in a Transit node B for Accounting purposes, when said messages are sent in the same direction (forward) as the originating CR message, showing framed in dashed lines the new actions according to the preferred embodiment of the present invention.
Figure 8:
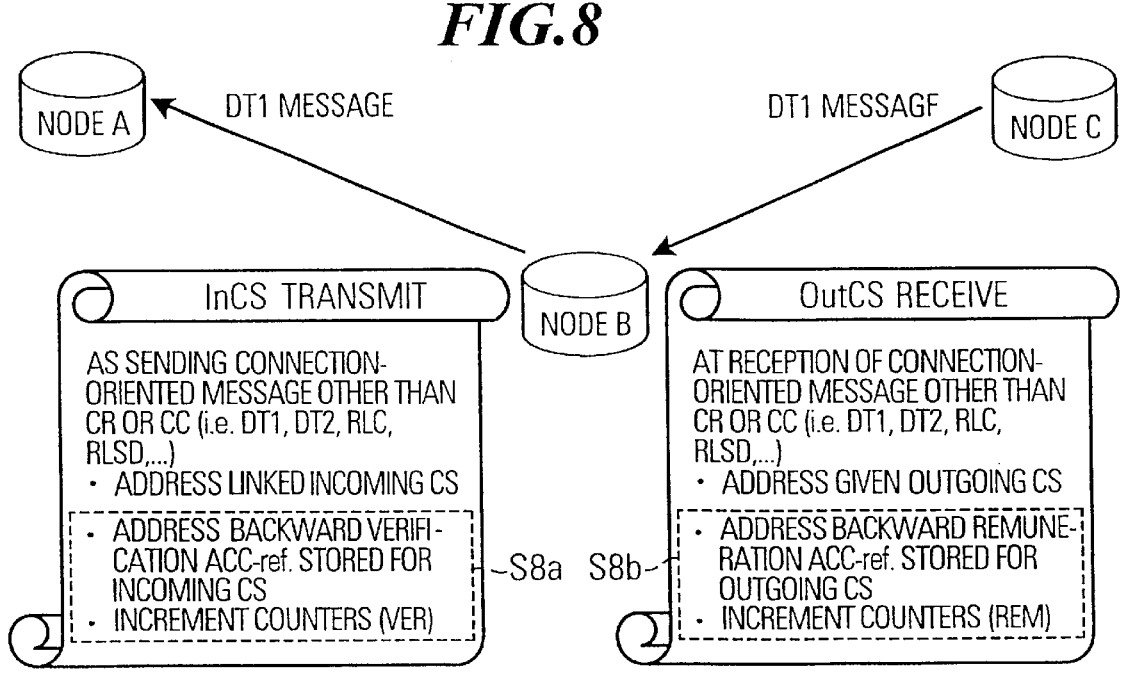
FIG. 8 basically presents the sequence of actions carried out at reception and transmission of Connection-Oriented messages other than CR or CC in a Transit node for Accounting purposes, when said messages are sent in the same direction (backward) as the answering CC message, showing framed in dashed lines the new actions according to the preferred embodiment of the present invention.

FIG. 7 and FIG. 8 show the accounting of forward and backward DT1 messages, in particular showing more details of steps S9a, S9b, S8a, S8b as generally described in FIG. 4c. Thus, FIGS. 5 to 8 illustrate the method in accordance with the invention and the particularly advantageous embodiments of the present invention are indicated in FIGS. 5–8 with the dashed-line framed boxes.

Figure 5:
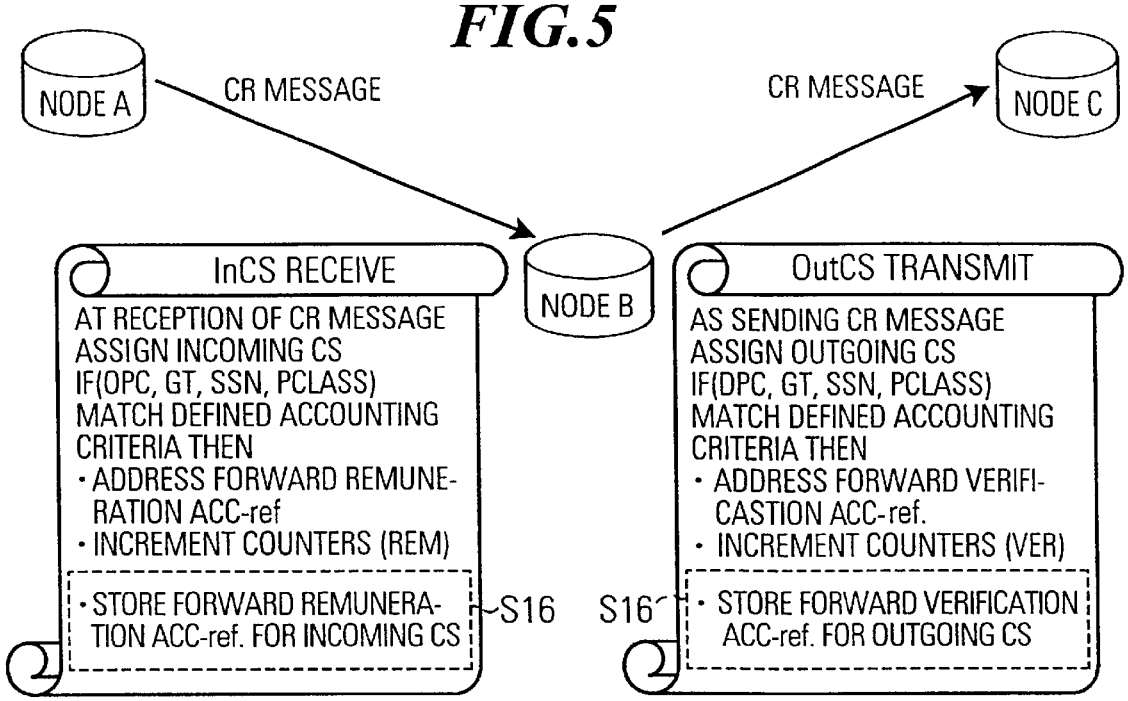
FIG. 5 basically presents the sequence of actions to be carried out at reception and transmission of CR messages in a Transit node B for Accounting purposes, showing framed in dashed lines the new actions according to the preferred embodiment of the present invention.

The embodiment described here is based on the information that an SCCP relay node (Node B) receives during the connection establishment procedure as illustrated in FIG. 5.

In an SCCP relay node, when a Connection Request message (a forward signalling message) is received, an incoming connection section InCS is seized and the following information is extracted for accounting purposes: The identity of the node that originates the CR, which is identified either by the Originating Point Code OPC in the Calling Address or by the OPC in the MTP routing label (by default);

the destination information, which is identified by the Global Title in the SCCP Called Address;

optionally, the service requested, which is identified by the Subsystem Number (SSN) in the SCCP Called Address, and the Protocol Class (PCLASS) of the received message.

Once the appropriate set of parameters above is selected, the Remuneration Accounting takes place for the received CR message. If the parameters (i.e. the forward communication parameter set) above match one amongst the defined accounting criteria (i.e. accounting parameter sets), a forward Remuneration Accounting reference (RemACCref) is found as a result of said matching. Then, a counter for number of messages and a counter for number of octets, under said forward Remuneration Accounting reference, will be increased. Eventually, the forward Remuneration Accounting reference (RemACCref) will be stored for the Incoming Connection Section as indicated with the dashed lines.

The SCCP can now relay the CR message towards the destination node and, to this end, an outgoing connection section OutCS is seized. Said outgoing connection section is internally linked to the previously seized incoming connection section in order to immediately route messages received from the incoming to the outgoing connection section and vice versa. When transmitting said CR message, the Verification Accounting can take place for such a relayed CR message. To achieve this, a similar set of forward communication parameters as above is built up with the following parameters:

the identity of the node where said CR message is transmitted to, which is the Destination Point Code DPC obtained from the Translation of the Global Title in the SCCP Called Address;

the destination information, which is identified by the Global Title in the SCCP Called Address;

optionally, the service requested, which is identified by the Protocol Class PCLASS in the received message and by the Subsystem Number SSN. The latter is either the one included in the SCCP Called Address or a new one obtained from the Translation of the Global Title in the SCCP Called Address.

Once the appropriate set of parameters above is selected, the Verification Accounting takes place for the transmitted CR message. If the forward parameter set matches one amongst the defined accounting criteria (accounting parameter sets), a forward Verification Accounting reference (VerACCref) is found as a result of said matching. Then, a counter for number of messages and a counter for number of octets, under said forward Verification Accounting reference, will be increased. Eventually, the forward Verification Accounting reference (VerACCref) will be stored for the Outgoing Connection Section as indicated with the dashed lines.

To complete the connection establishment procedure, a Connection Confirm message CC has to be sent backwards from the destination end node to the originating node through the relay node under reference. The actions to carry out in this relay node (node B) for Accounting purposes are illustrated in FIG. 6.

When a Connection Confirm CC message is received in the relay node, SCCP has to determine a backward communication parameter set to match the applicable accounting criteria (accounting parameter set). At this point, an additional explanation about the Connection Confirm CC message is required. The presence of GT in a CC message is optional according to the applicable standards. Moreover, the routing function is rather based on the previously seized and linked Incoming and Outgoing Connection Sections than on another message parameter. Consequently, the lack of such a parameter rather affects the Accounting criteria than the routing invocation. To overcome this possible lack of GT, which affects the destination information used for accounting, a default destination address can be provided to take part in the applicable accounting criteria.

When a Connection Confirm CC message is received in an SCCP relay node, the outgoing connection section OutCS, which was seized when the previous CR was sent, is received as Destination Local Reference and thus can be addressed in said SCCP relay node. All the information stored for such an outgoing connection section is now available at said SCCP relay node. Then, the received CC message parameters are analysed and the following information is extracted for accounting purposes:

- the identity of the node that originates the CC, which is identified either by the Originating Point Code (OPC) in the Calling Address or by the OPC in the MTP routing label (by default);
- the destination information, which is identified either by the Global Title in the SCCP Called Address, if present, or by a default destination address, if said GT in the SCCP Called Address is not present;
- optionally, the service requested, which is identified by the Subsystem Number (SSN) in the SCCP Called Address, and the Protocol Class (PCLASS) of the received message.

Once the appropriate set of parameters above is selected, the Remuneration Accounting takes place for the received CC message. If the parameters above match one amongst the defined accounting criteria, a backward Remuneration Accounting reference (RemACCref) is found as a result of said matching. Then, a counter for number of messages and a counter for number of octets, under said backward Remuneration Accounting reference, will be increased. Eventually, the backward Remuneration Accounting reference (RemACCref) will be stored for the Outgoing Connection Section as indicated.

The SCCP can now relay the CC message towards the originating node (Node A). To this end, the incoming connection section InCS, linked to the previously treated outgoing connection section, is seized. As transmitting said CC message, the Verification Accounting can take place for such a relayed CC message. To achieve this, a similar set of parameters as above is built up with the following parameters:

- the identity of the node where said CC message is transmitted to, which is the Destination Point Code DPC obtained from the Translation of the Global Title in the SCCP Called Address.
- the destination information, which is identified either by the Global Title in the SCCP Called Address, if present, or by a default destination address, if said GT in the SCCP Called Address is not present.
- optionally, the service requested, which is identified by the Protocol Class (PCLASS) in the received message and by the Subsystem Number (SSN). The latter is either the one included in the SCCP Called Address or a new one obtained from the Translation of the Global Title in the SCCP Called Address, or a default value.

Once the appropriate set of parameters above is selected, the Verification Accounting takes place for the transmitted CC message. If the parameters above match one amongst the defined accounting criteria, a backward Verification Accounting reference (VerACCref) is found as a result of said matching. Then, a counter for number of messages and a counter for number of octets, under said backward Verification Accounting reference, will be increased. Eventually, the backward Verification Accounting reference (VerACCref) will be stored for the Incoming Connection Section, as indicated with the dashed lines.

Once the connection has been established, all the Connection-Oriented messages can now be taken into consideration for Accounting purposes in accordance to one of the preferred aspects of the present invention. Given that Connection-Oriented messages, other than CR and CC, make use of the connection section identifiers for routing purposes, said Connection-Oriented messages can always find the applicable Remuneration and Verification Accounting references wherein the appropriate counters reside.

Moreover, all the connection-oriented messages in the forward direction will undergo remuneration accounting by making use of the forward remuneration accounting reference stored in the Incoming Connection Section and verification accounting by making use of the forward verification accounting reference stored in the Outgoing Connection Section. In accordance to this method, and as illustrated in FIG. 7, the explanatory DT1 message contains as Source Local Reference the outgoing connection section given at the node A, and as Destination Local Reference the incoming connection section seized at node B when the initial CR message was received. The SCCP relay node can address this incoming connection section to get the forward Remuneration Accounting reference. Then, said accounting reference is addressed and the appropriate counters are thus reached and increased. Furthermore, as transmitting the explanatory DT1 message towards the destination node (Node C), the outgoing connection section, seized when transmitting the initial CR message and linked to the previous incoming connection section in said Node B, is addressed to get the forward Verification Accounting reference. Then, said accounting reference is addressed and the appropriate counters are thus reached and increased.

Still further, all the connection-oriented messages in the backward direction will undergo remuneration accounting by making use of the backward remuneration accounting reference stored in the Outgoing Connection Section and verification accounting by making use of the backward verification accounting reference stored in the Incoming Connection Section. In accordance to this method, and as illustrated in FIG. 8, the explanatory DT1 message contains as Source Local Reference the incoming connection section given at the node C, and as Destination Local Reference the outgoing connection section seized at node B when the initial CR message was sent. The SCCP relay node can address this outgoing connection section to get the backward Remuneration Accounting reference. Then, said accounting reference is addressed and the appropriate counters are thus reached and increased. Furthermore, as transmitting the explanatory DT1 message towards the originating node (Node A), the incoming connection section, seized when receiving the initial CR message and linked to the previous outgoing connection section in said Node B, is addressed to get the backward Verification Accounting reference. Then, said accounting reference is addressed and the appropriate counters are thus reached and increased.

The additional process required in the accounting measurements of these messages is very low as long as the reference needed for accounting measurements have been already stored during the connection establishment.

Use Case for the Second Embodiment of the Invention

An explanatory use case is presented and described in detail for a preferred embodiment of the present invention, and in accordance to the above detailed description of the invention. Said explanatory use case is illustrated in FIGS. 9a–9j wherein exemplary values for all the implicated relevant data are provided on a per node basis as well as transmitted by protocol parameters when applicable.

The use case assumes a Connection-Oriented communication between two end users respectively located in nodes A and D whereas nodes B and C are assumed as belonging to transit networks and thus different from the originating and destination networks represented by A and D.

Figure 9A:
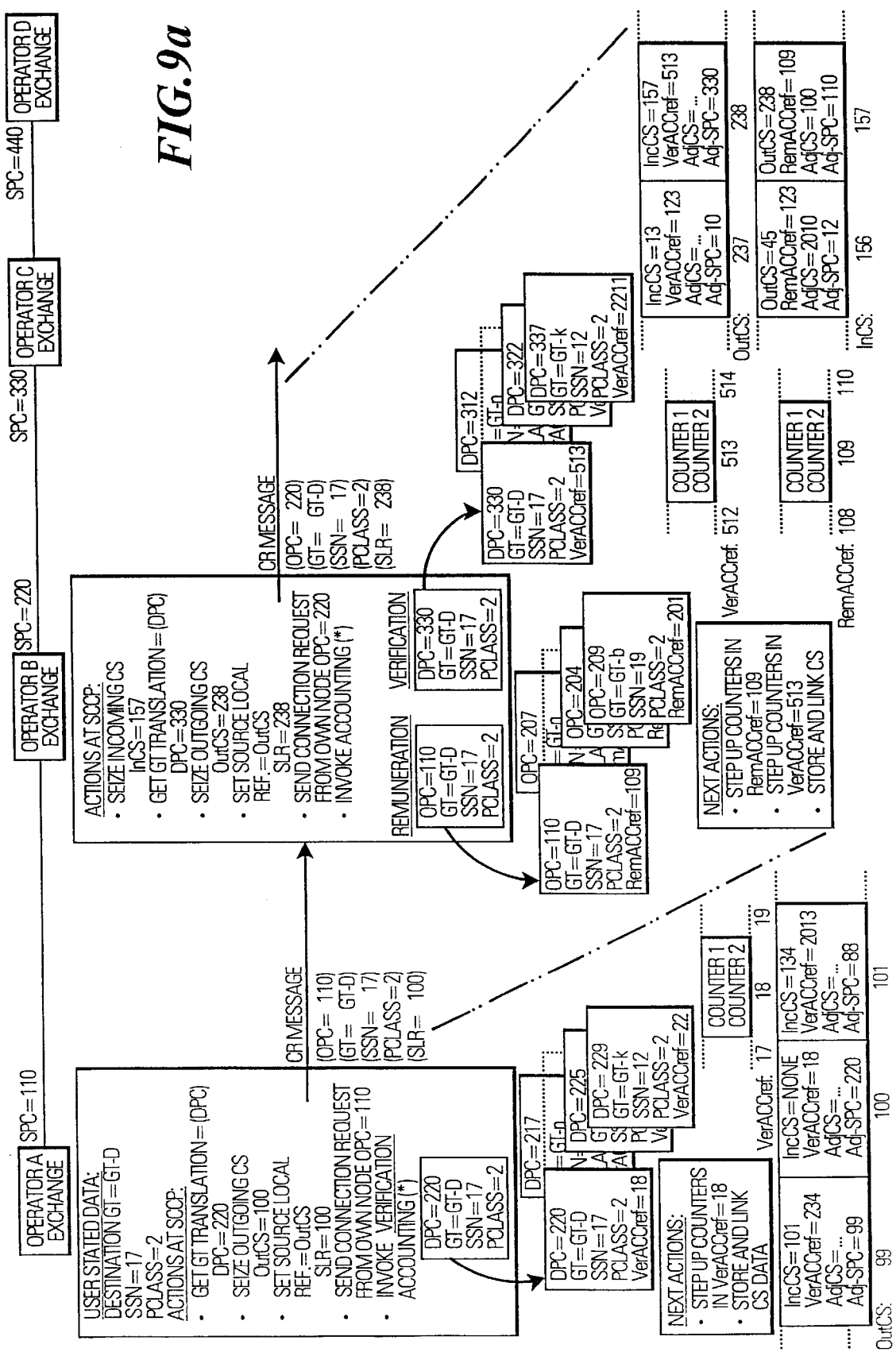

As illustrated in FIG. 9a, when a CO-user in node A wants to initiate a communication towards another CO-user in node D, the former indicates to the SCCP service in node A the address of the latter. The destination node D is identified by a Global Title (GT-D) and the destination CO-user is identified in terms of a Subsystem Number (SSN=17). These data are both included in the parameter Called Party Address. Besides, the originating CO-user also indicates the service required by means of the Protocol Class value (PCLASS=2).

When SCCP receives such an indication from a CO-user, the received GT is translated to find the Destination signalling Point Code (DPC=220), namely the next node in the signalling path to be followed, where the message should be transmitted first. Then, an idle Outgoing Connection Section (OutCS=100) not used by any other communication is seized to deal with the present one. This OutCS will be transmitted to the next node as the Source Local Reference (SLR=100) for further backward messages related to the present communication.

More specifically, the Source Local Reference is an internal reference which unambiguously identifies the OutCS, rather than being exactly the same. However, for the explanatory purpose of this embodiment such equivalence is perfectly valid, as any person skilled in the art can realise.

At this point SCCP issues a Connection Request message towards the DPC=220, with OPC=110 (own node), SLR=100, and the parameter data received from the CO-user: GT-D, SSN=17, PCLASS=2.

Once this message is sent, the SCCP in node A invokes the Accounting Verification function. To this end, SCCP fetches amongst the defined verification accounting criteria one criterion with GT-D, SSN=17, PCLASS=2 and DPC=220. Then, SCCP finds for such a criterion the VerACCRef=18. The SCCP will address the two counters stored under such a VerACCRef=18, and will increase the number of octets counter with the currently sent amount of octets (in the sent CR message), and will step up the counter for number of messages sent. So far, this is how the existing function works.

In accordance to the present invention, the meaning and value of the VerACCref is stored in the OutCS record for further use. Said OutCS=100 will now contain such a VerACCRef=18 along with previous significant data related to such an outgoing connection section. Examples of these significant data (stored for OutCS=100 record) can be the Adjacent Signalling Point Code (Adj-SPC=220), Adjacent Connection Section (still unknown), and related Incoming Connection Section (none or local CO-user).

When the CR message is received in node B (SPC=220), an idle Incoming Connection Section is seized (InCS=157) and marked busy for the present communication. The received GT is again translated to find the current Destination signalling Point Code (DPC=330), namely the next node in the signalling path to be followed, where the message should be transmitted next. Then, an idle Outgoing Connection Section (OutCS=238) is seized and marked busy for the present communication. This OutCS will be transmitted to the next node as the Local Source Reference (SLR=238) for further backward messages related to the present communication.

At this point, the SCCP in node B transmits the Connection Request message towards the DPC=330, with OPC=220 (own node), SLR=238, and the parameter data received from the previous node: GT-D, SSN=17, PCLASS=2.

Once this message is sent, the SCCP in node B invokes the Accounting Remuneration function for the node A and the Accounting Verification function for the node C.

For Accounting Remuneration, SCCP fetches amongst the defined remuneration accounting criteria one criterion with GT-D, SSN=17, PCLASS=2 and OPC=110. Then, SCCP finds for such a criterion the Rem=109. The SCCP will address the two counters stored under such a RemACCref=109, and will increase the number of octets counter with the currently sent amount of octets (in the received CR message), and will step up the counter for number of messages sent. So far, this is how the existing function works.

In accordance to the present invention, the meaning and value of the RemACCref is stored in the InCS record for further use. Said InCS=157 will now contain such a RemACCRef=109 along with previous significant data related to such an incoming connection section. Examples of these significant data (stored for InCS=157 record) can be the Adjacent Signalling Point Code (Adj-SPC=110), Adjacent Connection Section (AdjCS=100), and related Outgoing Connection Section (OutCS=238).

For Accounting Verification, SCCP fetches amongst the defined verification accounting criteria one criterion with GT-D, SSN=17, PCLASS=2 and DPC=330. Then, SCCP finds for such a criterion the VerACCref=513. The SCCP will address the two counters stored under such a VerACCref=513, and will increase the number of octets counter with the currently sent amount of octets (in the received CR message), and will step up the counter for number of messages sent. So far, this is how the existing function works.

In accordance to the present invention, the meaning and value of the VerACCref is stored in the OutCS record for further use. Said OutCS=238 will now contain such a VerACCref=513 along with previous significant data related to such an outgoing connection section. Examples of these significant data (stored for OutCS=238 record) can be the Adjacent Signalling Point Code (Adj-SPC=330), Adjacent Connection Section (still unknown), and related Incoming Connection Section (InCS=157).

As illustrated in FIG. 9b, when the CR message is received in node C (SPC=330), an idle Incoming Connection Section is seized (InCS=32) and marked busy for the present communication. The received GT is again translated to find the current Destination signalling Point Code (DPC=440), namely the next node in the signalling path to be followed, where the message should be transmitted next. Then, an idle Outgoing Connection Section (OutCS=81) is seized and marked busy for the present communication. This OutCS will be transmitted to the next node as the Local Source Reference (SLR=81) for further backward messages related to the present communication.

At this point, the SCCP in node C transmits the Connection Request message towards the DPC=440, with OPC=330 (own node), SLR=81, and the parameter data received from the previous node: GT-D, SSN=17, PCLASS=2.

Once this message is sent, the SCCP in node C invokes the Accounting Remuneration function for the node B, and the Accounting Verification function for the node D.

For Accounting Remuneration, SCCP fetches amongst the defined remuneration accounting criteria one criterion with GT-D, SSN=17, PCLASS=2 and OPC=220. Then, SCCP finds for such a criterion the RemACCref=25. The SCCP will address the two counters stored under such a RemACCref=25, and will increase the number of octets counter with the currently sent amount of octets (in the sent CR message), and will step up the counter for number of messages sent. So far, this is how the existing function works.

In accordance to the present invention, the meaning and value of the RemACCref is stored in the InCS record for further use. Said InCS=32 will now contain such a RemACCref=25 along with previous significant data related to such an incoming connection section. Examples of these significant data (stored for InCS=32 record) can be the Adjacent Signalling Point Code (Adj-SPC=220), Adjacent Connection Section (AdjCS=238), and related Outgoing Connection Section (OutCS=81).

For Accounting Verification, SCCP fetches amongst the defined verification accounting criteria one criterion with GT-D, SSN=17, PCLASS=2 and DPC=440. Then, SCCP finds for such a criterion the VerACCref=34. The SCCP will address the two counters stored under such a VerACCref=34, and will increase the number of octets counter with the currently sent amount of octets (in the sent CR message), and will step up the counter for number of messages sent. So far, this is how the existing function works.

In accordance to the present invention, the meaning and value of the VerACCref is stored in the OutCS record for further use. Said OutCS=81 will now contain such a VerACCref=34 along with previous significant data related to such an outgoing connection section. Examples of these significant data (stored for OutCS=81 record) can be the Adjacent Signalling Point Code (Adj-SPC=440), Adjacent Connection Section (still unknown), and related Incoming Connection Section (InCS=32).

Figure 9C:
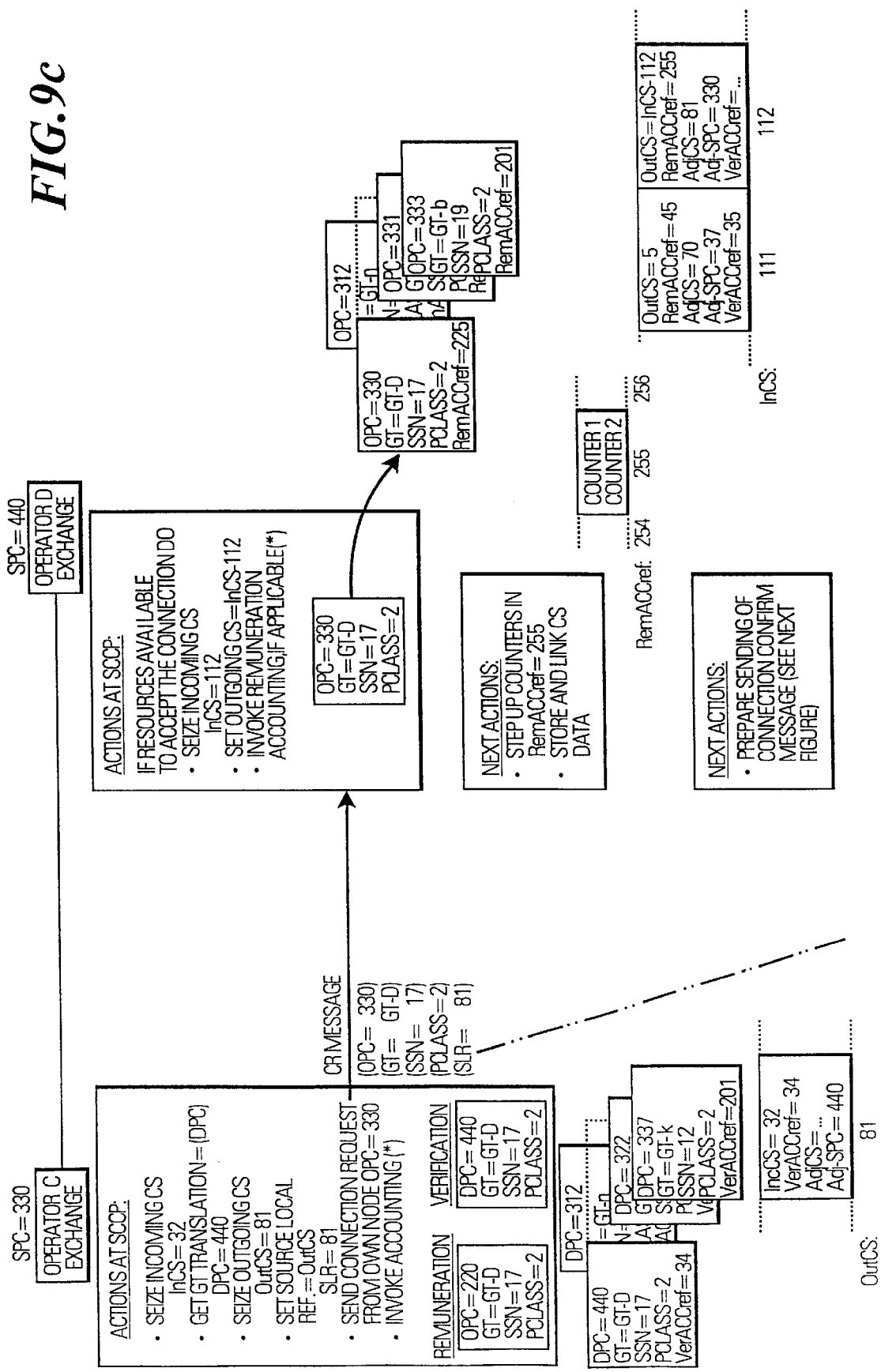

As illustrated in FIG. 9c, when the CR message is received in node D (SPC=440), an idle Incoming Connection Section is seized (InCS=112) and marked busy for the present communication. The received GT is again translated to find that a local CO application (SSN=17) is the addressed destination. Then, the message is delivered to such a CO-user along with the Incoming Connection Section identifier (IncCS=112) for further communications.

At this point, the SCCP might invoke the Accounting Remuneration function. In most of the cases, such a function is not invoked given that the CR message terminates in current node without being transmitted anywhere. The fact of having invoked the Verification Accounting function in previous node is justified since such a previous node (SPC=330) was not aware the signalling path terminates in this one. This verification will simply not be taken into account when balancing counters from C to D about signalling terminating in D. However, some operators might want to bill for such a service backward by invoking this Remuneration Accounting. In this case, SCCP fetches amongst the defined remuneration accounting criteria one criterion with GT-D, SSN=17, PCLASS=2 and OPC=330. Then, SCCP finds for such a criterion the RemACCref=255. The SCCP will address the two counters stored under such a RemACCref=255, and will increase the number of octets counter with the currently delivered amount of octets (in the received CR message), and will step up the counter for number of messages delivered to the CO-user. So far, this is how the existing function works.

In accordance to the present invention, the meaning and value of the RemACCref is stored in the InCS record for further use. Said InCS=112 will now contain such a RemACCref=255 along with previous significant data related to such an incoming connection section. Examples of these significant data (stored for InCS=112 record) can be the Adjacent Signalling Point Code (Adj-SPC=330), Adjacent Connection Section (AdjCS=81), and related Outgoing Connection Section (OutCS=InCS-112) which will be the same as receiving the CR message.

At reception of the CR message by the CO-user, proper actions are taken according to applicable standards and which are not part of, or affected by, the present invention. Provided that the CO-user can accept such a request, the corresponding Connection Confirm message is triggered to the SCCP.

Figure 9D:
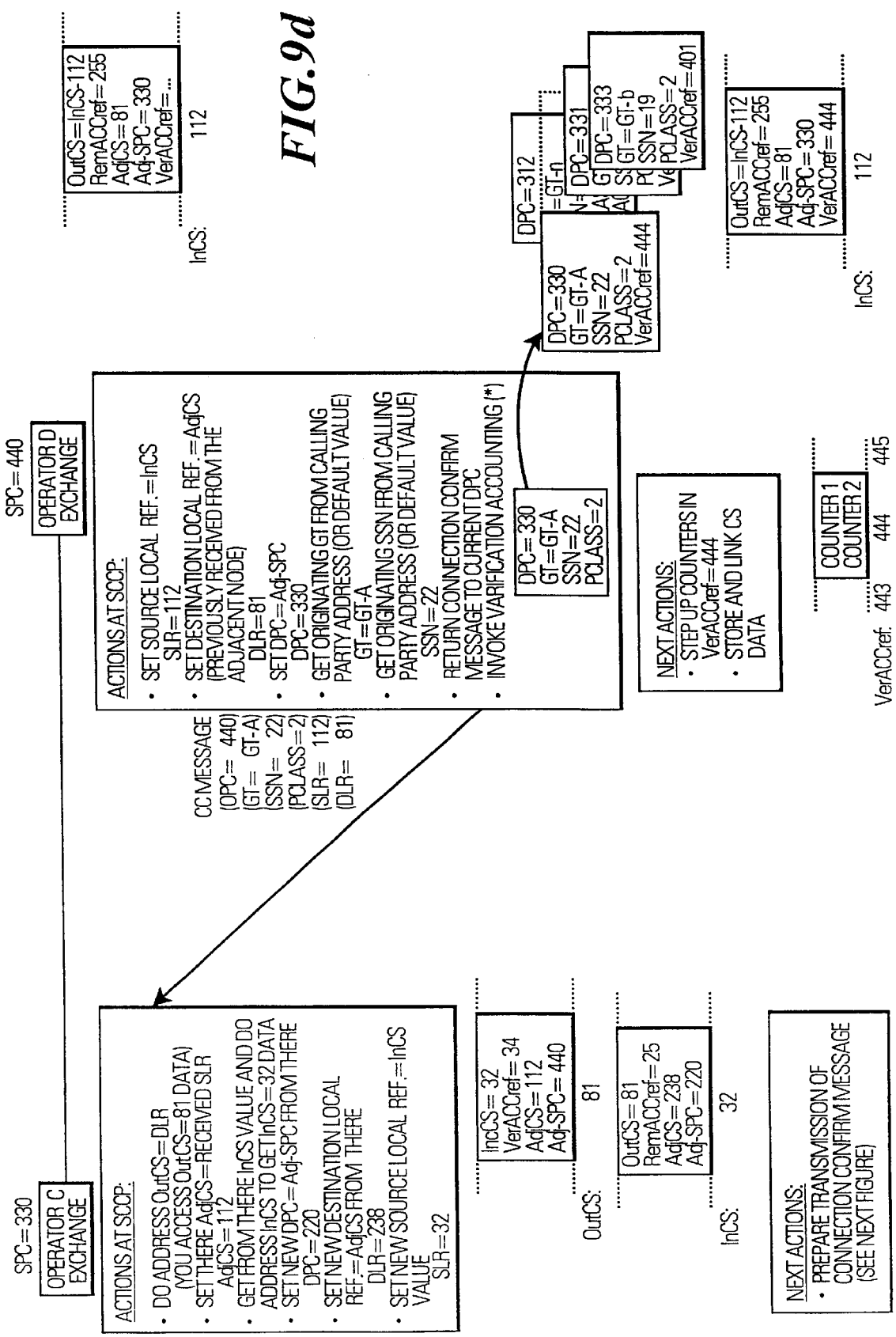

Then, as illustrated in FIG. 9d, the SCCP prepares the sending back of the expected Connection Confirm message. To this end, the Incoming Connection Section will be transmitted as the Source Local Reference (SLR=112). The current Destination signalling Point Code, where the message should be first transmitted, will be the one stored as Adj-SPC (DPC=330), and the also stored AdjCS will be sent as Destination Local Reference (DLR=81).

At this point and for the sake of clarity, a more specific explanation than a previously mentioned one has to be outlined. The Source Local Reference is an internal reference which unambiguously identifies the applicable InCS or OutCS, rather than being exactly the same. However, the Destination Local Reference takes the value (Adj-CS) previously sent from the adjacent node (Adj-SPC) as SLR. How the adjacent node will find the applicable InCS or OutCS from the received DLR depends on how said adjacent node derived the original SLR from the applicable InCS or OutCS. Nevertheless, for the explanatory purpose of this embodiment such equivalence (SLR=InCS, or SLR=OutCS, or viceverse) is perfectly valid to simplify the use of SLR and DLR, as any person skilled in the art can realise. At this point, the SCCP in node D sends back the Connection Confirm (CC) message towards the DPC=330, with OPC=440 (own node), DLR=81, SLR=112, and the parameter data received from the previous node: PCLASS=2. In addition, the SCCP might also send a Global Title (GT-A) and a CO-user identifier (SSN=22) as new Called Party Address, which were either previously received as Calling Party Address, or set by default for accounting and other purposes.

Once this message is sent, the SCCP in node D invokes the Accounting Verification function. To this end, SCCP fetches amongst the defined verification accounting criteria one criterion with GT-A, SSN=22, PCLASS=2 and DPC=330. Then, SCCP finds for such a criterion the VerACCref=444. The SCCP will address the two counters stored under such a VerACCref=444, and will increase the number of octets counter with the currently sent amount of octets (in the sent back CC message), and will step up the counter for number of messages sent.

In accordance to the present invention, the meaning and value of the VerACCref is stored in the InCS record for further use. Said InCS=112 will now contain such a backward VerACCref=444 along with previous significant data related to such an incoming connection section. Examples of these significant data (stored for InCS=112 record) can be the Adjacent Signalling Point Code (Adj-SPC=330), Adjacent Connection Section (AdjCS=81), related Outgoing Connection Section (Inc-112), and the forward RemACCref=255.

It should be noted that there is no need to have an outgoing connection section associated to this communication since the messages back are going to be transmitted through the already established signalling path addressed by the exchanged SLR and DLR (InCS=112).

As also illustrated in FIG. 9d, when the CC message is received in node C (SPC=330), the Outgoing Connection Section addressed by DLR is pointed out to get significant data (OutCS=81). Under this record (for OutCS=81) the still unknown AdjCS is set to the value received as SLR (AdjCS=112). Then, the stored InCS value is pointed out to get significant data for transmitting the received message (InCS=32). Under this record (for InCS=32), the Adj-SPC will be used as the current Destination signalling Point Code (DPC=220), namely the next node in the signalling path to be followed, where the message should be transmitted next. Also under this record (for InCS=32), the AdjCS will be used as the current Destination Local Reference (DLR=238), whereas the addressed InCS will be sent as the current Source Local Reference (SLR=32).

Figure 9E:
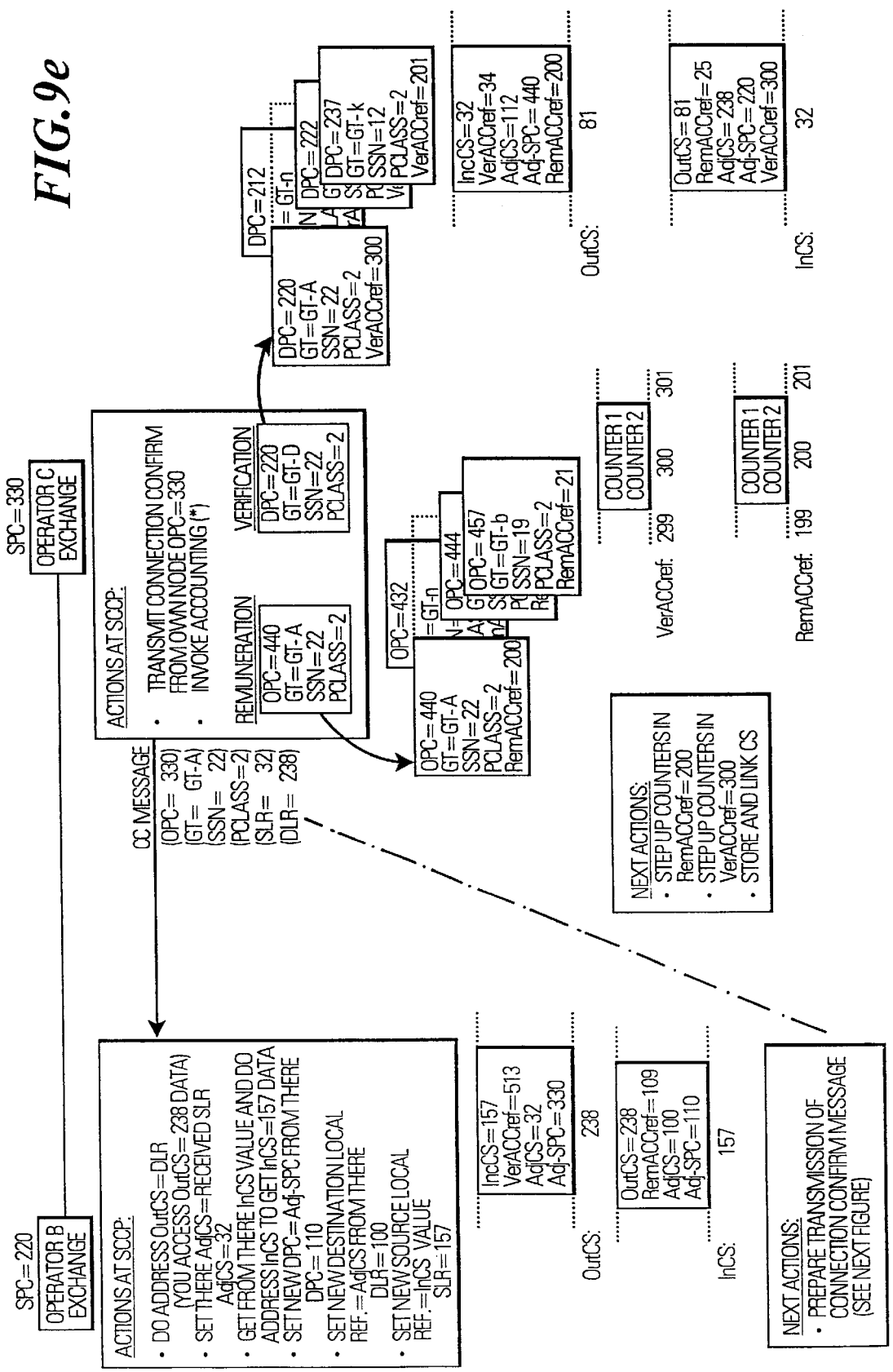

At this point and as illustrated in FIG. 9e, the SCCP in node C transmits the Connection Confirm message towards the DPC=220, with OPC=330 (own node), SLR=32, DLR=238, and the parameter data received from the previous node: GT-A, SSN=22, PCLASS=2.

Once this message is sent, the SCCP in node C invokes the Accounting Remuneration function for the node D, and the Accounting Verification function for the node B.

For Accounting Remuneration, SCCP fetches amongst the defined remuneration accounting criteria one criterion with GT-A, SSN=22, PCLASS=2 and OPC=440. Then, SCCP finds for such a criterion the RemACCref=200. The SCCP will address the two counters stored under such a RemACCref=200, and will increase the number of octets counter with the currently sent amount of octets (in the received CC message), and will step up the counter for number of messages sent.

In accordance to the present invention, the meaning and value of the RemACCref is stored in the OutCS record for further use. Said OutCS=81 will now contain such a backward RemACCref=200 along with previous significant data related to such an outgoing connection section. Examples of these significant data (stored for OutCS=81 record) can be the Adjacent Signalling Point Code (Adj-SPC=440), Adjacent Connection Section (AdjCS=112), related Incoming Connection Section (InCS=32), and the forward VerACCref=34.

For Accounting Verification, SCCP fetches amongst the defined verification accounting criteria one criterion with GT-A, SSN=22, PCLASS=2 and DPC=220. Then, SCCP finds for such a criterion the VerACCref=300. The SCCP will address the two counters stored under such a VerACCref=300, and will increase the number of octets counter with the currently sent amount of octets (in the sent back CC message), and will step up the counter for number of messages sent.

In accordance to the present invention, the meaning and value of the VerACCref is stored in the InCS record for further use. Said InCS=32 will now contain such a backward VerACCref=300 along with previous significant data related to such an incoming connection section. Examples of these significant data (stored for InCS=32 record) can be the Adjacent Signalling Point Code (Adj-SPC=220), Adjacent Connection Section (AdjCS=238), related Outgoing Connection Section (OutCS=81), and the forward RemACCref=25. As also illustrated in FIG. 9e, when the CC message is received in node B (SPC=220), the Outgoing Connection Section addressed by DLR is pointed out to get significant data (OutCS=238). Under this record (for OutCS=238) the still unknown AdjCS is set to the value received as SLR (AdjCS=32). Then, the stored InCS value is pointed out to get significant data for transmitting the received message (InCS=157). Under this record (for InCS=157), the Adj-SPC will be used as the current Destination signalling Point Code (DPC=110), namely the next node in the signalling path to be followed, where the message should be transmitted next. Also under this record (for InCS=157), the AdjCS will be used as the current Destination Local Reference (DLR=100), whereas the addressed InCS will be sent as the current Source Local Reference (SLR=157).

Figure 9F:
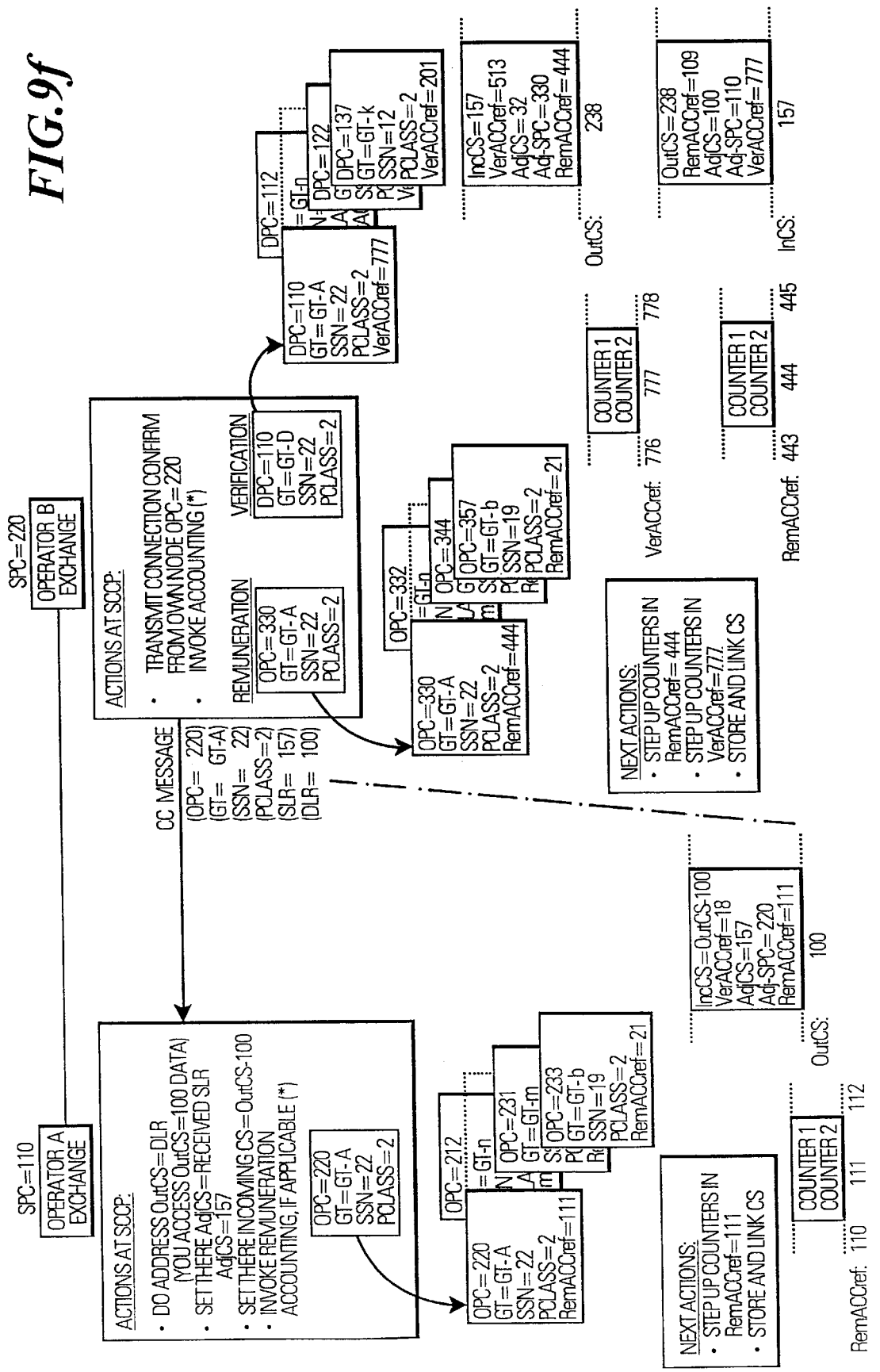

At this point and as illustrated in FIG. 9f, the SCCP in node B transmits the Connection Confirm message towards the DPC=110, with OPC=220 (own node), SLR=157, DLR=100, and the parameter data received from the previous node: GT-A, SSN=22, PCLASS=2.

Once this message is sent, the SCCP in node B invokes the Accounting Remuneration function for the node C, and the Accounting Verification function for the node A.

Notice that the node B might ignore that the message terminates in node A, or whether A will perform or not the Remuneration Accounting for terminating messages.

For Accounting Remuneration, SCCP fetches amongst the defined remuneration accounting criteria one criterion with GT-A, SSN=22, PCLASS=2 and OPC=330. Then, SCCP finds for such a criterion the RemACCref=444. Notice that these references are taken on local basis. The SCCP will address the two counters stored under such a RemACCref=444, and will increase the number of octets counter with the currently sent amount of octets (in the received CC message), and will step up the counter for number of messages sent.

In accordance to the present invention, the meaning and value of the RemACCref is stored in the OutCS record for further use. Said OutCS=238 will now contain such a backward RemACCref=444 along with previous significant data related to such an outgoing connection section. Examples of these significant data (stored for OutCS=238 record) can be the Adjacent Signalling Point Code (Adj-SPC=330), Adjacent Connection Section (AdjCS=32), related Incoming Connection Section (InCS=157), and the forward VerACCref=513.

For Accounting Verification, SCCP fetches amongst the defined verification accounting criteria one criterion with GT-A, SSN=22, PCLASS=2 and DPC=110. Then, SCCP finds for such a criterion the VerACCref=777. The SCCP will address the two counters stored under such a VerACCref=777, and will increase the number of octets counter with the currently sent amount of octets (in the sent back CC message), and will step up the counter for number of messages sent.

In accordance to the present invention, the meaning and value of the VerACCref is stored in the InCS record for further use. Said InCS=157 will now contain such a backward VerACCref=777 along with previous significant data related to such an incoming connection section. Examples of these significant data (stored for InCS=157 record) can be the Adjacent Signalling Point Code (Adj-SPC=110), Adjacent Connection Section (AdjCS=100), related Outgoing Connection Section (OutCS=238), and the forward RemACCref=109.

As also illustrated in FIG. 9f, when the CC message is received in node A (SPC=110), the Outgoing Connection Section addressed by DLR is pointed out to get significant data (OutCS=100). Under this record (for OutCS=100) the still unknown AdjCS is set to the value received as SLR (AdjCS=157). Then, the stored InCS value is pointed out to get significant data for transmitting the received message (InCS=none). The fact of finding InCS=none implies that the message was originated by a local CO-user. SCCP will deliver the received message by using standard protocol means outside the scope of this invention. In addition and for the sake of alignment with the terminating node, SCCP might as well store as new InCS value some reference to the existing OutCS (InCS=OutCS-100). Nevertheless, this data is not essential provided that the SCCP makes use of other protocol means to know that the message was locally originated. Then, the message is delivered to the corresponding CO-user along with the Outgoing Connection Section identifier (OutCS=100) for further communications.

At this point, the SCCP might invoke the Accounting Remuneration function. In most of the cases, such a function is not invoked given that the CC message terminates in current node without being transmitted anywhere. The fact of having invoked the Verification Accounting function in previous node is justified since such a previous node (SPC=220) was not aware the signalling path terminates in this one. This verification will simply not be taken into account when balancing counters from B to A about signalling terminating in A. However, some operators might want to bill for such a service backward by invoking this Remuneration Accounting. In this case, SCCP fetches amongst the defined remuneration accounting criteria one criterion with GT-A, SSN=22, PCLASS=2 and OPC=220. Then, SCCP finds for such a criterion the RemACCref=111. The SCCP will address the two counters stored under such a RemACCref=111, and will increase the number of octets counter with the currently delivered amount of octets (in the delivered CC message), and will step up the counter for number of messages delivered to the CO-user.

In accordance to the present invention, the meaning and value of the RemACCref is stored in the OutCS record for further use. Said OutCS=100 will now contain such a backward RemACCref=111 along with previous significant data related to such an outgoing connection section. Examples of these significant data (stored for OutCS=100 record) can be the Adjacent Signalling Point Code (Adj-SPC=220), Adjacent Connection Section (AdjCS=157), related Incoming Connection Section (InCS=OutCS-100) which will be the same as sending the CR message, and the forward VerACCref=18.

At this point, both originating and terminating CO-users (respectively located at nodes A and D) can send DT1 messages to the other end and, according to the main object of the present invention, all this CO messages can be accounted under appropriate accounting criteria. In accordance to this behaviour, the actions illustrated in FIG. 9g from node A onwards, or the actions illustrated in FIG. 9i from node D backwards can be performed in any order and at any time. For simplicity reason and for the sake of sequence, the following explanations start when CO-user in node A triggers the sending of DT1 towards the destination CO-user in node D.

Figure 9G:
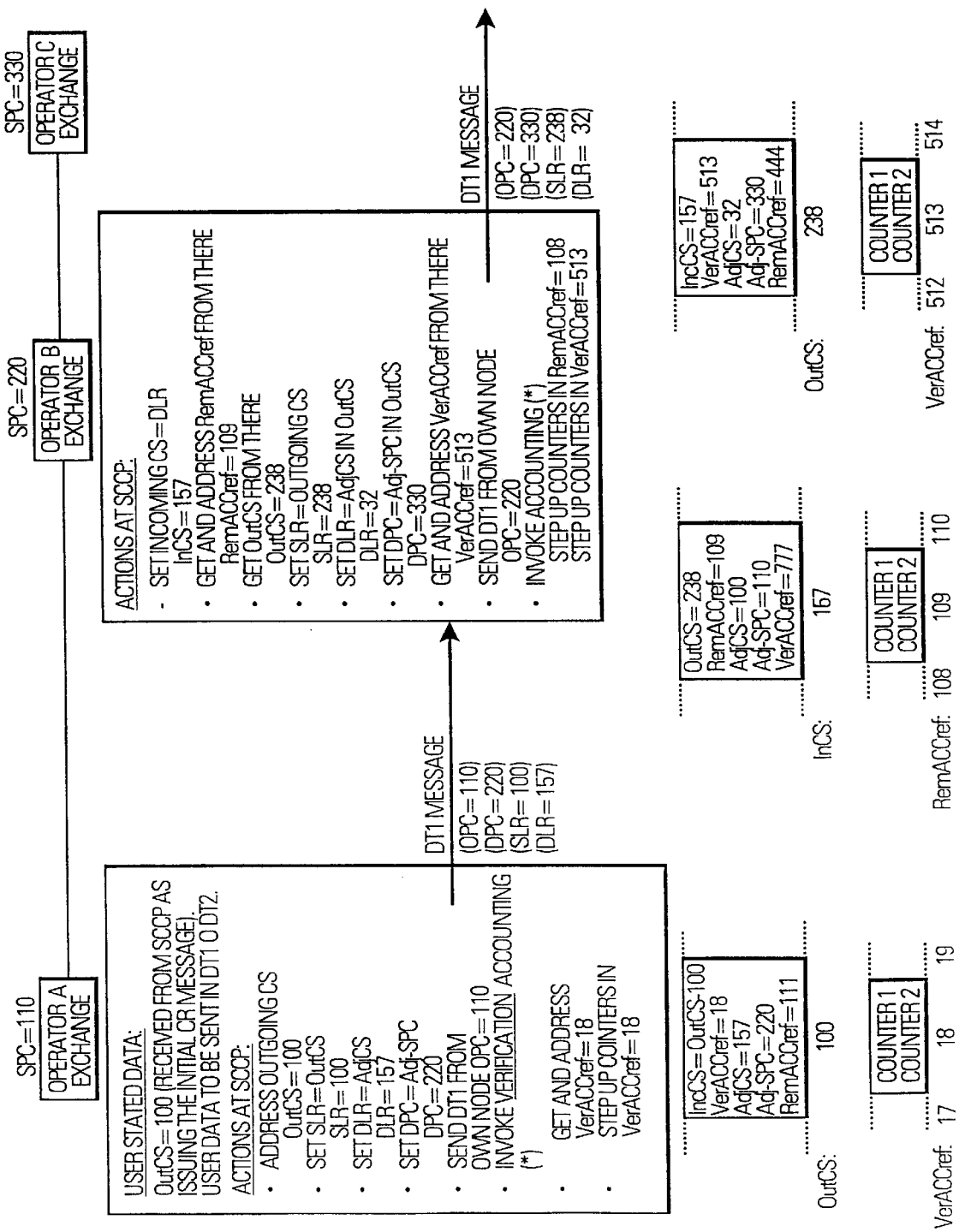

As illustrated in FIG. 9g, when a CO-user in node A wants to send a DT1 message towards another CO-user in node D, the former indicates to the SCCP service in node A the previously received connection section identifier (OutCS=100) along with the User Data to be sent.

When SCCP receives such an indication from a CO-user, the received connection section is addressed to get relevant data from such a OutCS=100 storage. Under this record (for OutCS=100), the Adj-SPC will be used as the current Destination signalling Point Code (DPC=220), namely the next node in the signalling path to be followed, where the message should be transmitted next. Also under this record (for OutCS=100), the AdjCS will be used as the current Destination Local Reference (DLR=157), whereas the addressed OutCS will be sent as the current Source Local Reference (SLR=100).

At this point and as illustrated in FIG. 9g, the SCCP in node A sends the DT1 message towards the DPC=220, with OPC=110 (own node), DLR=157, and SLR=100.

Once this message is sent, the SCCP in node A invokes the Accounting Verification function. To this end, according to the present invention and given that the DT1 message was sent through an outgoing connection section, SCCP fetches in OutCS=100 data the forward VerACCref to find VerACCref=18. The SCCP will address the two counters stored under such a VerACCref=18, and will increase the number of octets counter with the currently sent amount of octets (in the sent DT1 message), and will step up the counter for number of messages sent.

As also illustrated in FIG. 9g, when the DT1 message is received in node B (SPC=220), the Incoming Connection Section addressed by DLR is pointed out to get significant data (InCS=157). Under this record (for InCS=157), according to the present invention and given that the DT1 message was received through an incoming connection section, SCCP fetches the forward RemACCref to find and temporary save for further invocation the RemACCref=109. Also under this record (InCS=157), the stored OutCS value is pointed out and addressed (OutCS=238). Under this record (for OutCS=238), the Adj-SPC will be used as the current Destination signalling Point Code (DPC=330), namely the next node in the signalling path to be followed, where the message should be transmitted next. Also under this record (for OutCS=238), the AdjCS will be used as the current Destination Local Reference (DLR=32), whereas the addressed OutCS will be sent as the current Source Local Reference (SLR=238). And still under this record (OutCS=238), according to the present invention and given that the DT1 message will be sent through an outgoing connection section, SCCP fetches the forward VerACCref to find and temporary save for further invocation the VerACCref=513.

At this point, the SCCP in node B transmit the DT1 message towards the DPC=330, with OPC=220 (own node), DLR=32, and SLR=238. Once this message is sent, the SCCP in node B invokes the forward Accounting function.

For Accounting Remuneration, the SCCP will address the two counters stored under the temporary stored RemACCref=109, and will increase the number of octets counter with the previously received amount of octets (in the received DT1 message), and will step up the counter for number of messages transmitted.

For Accounting Verification, the SCCP will address the two counters stored under the temporary stored VerACCref=513, and will increase the number of octets counter with the currently sent amount of octets (in the transmitted DT1 message), and will step up the counter for number of messages sent.

Figure 9H:
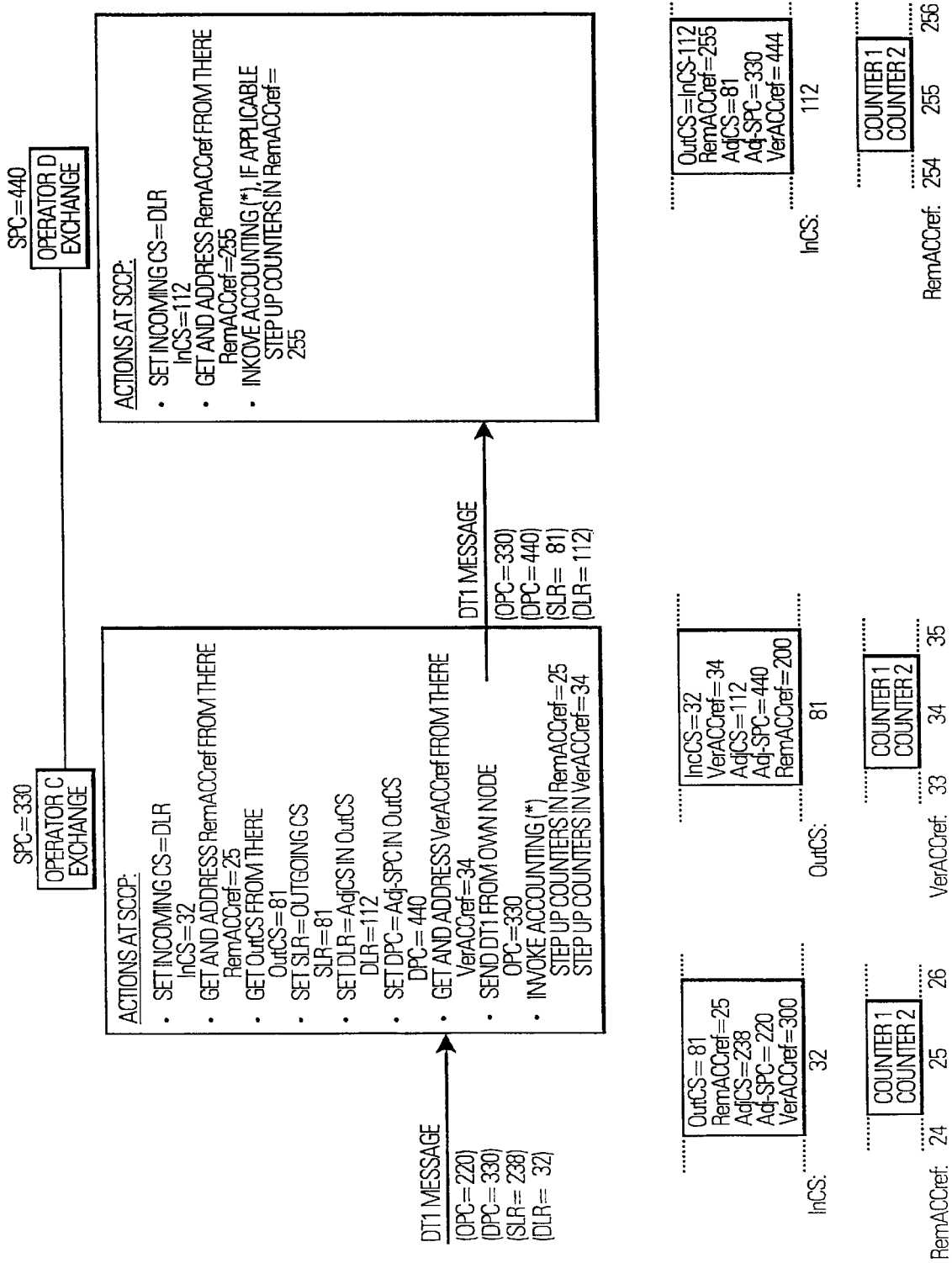

As illustrated in FIG. 9h, when the DT1 message is received in node C (SPC=330), the Incoming Connection Section addressed by DLR is pointed out to get significant data (InCS=32). Under this record (for InCS=32), according to the present invention and given that the DT1 message was received through an incoming connection section, SCCP fetches the forward RemACCref to find and temporary save for further invocation the RemACCref=25. Also under this record (InCS=32), the stored OutCS value is pointed out and addressed (OutCS=81). Under this record (for OutCS=81), the Adj-SPC will be used as the current Destination signalling Point Code (DPC=440), namely the next node in the signalling path to be followed, where the message should be transmitted next. Also under this record (for OutCS=81), the AdjCS will be used as the current Destination Local Reference (DLR=112), whereas the addressed OutCS will be sent as the current Source Local Reference (SLR=81). And still under this record (OutCS=81), according to the present invention and given that the DT1 message will be sent through an outgoing connection section, SCCP fetches the forward VerACCref to find and temporary save for further invocation the VerACCref=34.

At this point, the SCCP in node C transmits the DT1 message towards the DPC=440, with OPC=330 (own node), DLR=112, and SLR=81. Once this message is sent, the SCCP in node C invokes the forward Accounting function.

For Accounting Remuneration, the SCCP will address the two counters stored under the temporary stored RemACCref=25, and will increase the number of octets counter with the previously received amount of octets (in the received DT1 message), and will step up the counter for number of messages transmitted.

For Accounting Verification, the SCCP will address the two counters stored under the temporary stored VerACCref=34, and will increase the number of octets counter with the currently sent amount of octets (in the transmitted DT1 message), and will step up the counter for number of messages sent.

As also illustrated in FIG. 9h, when the DT1 message is received in node D (SPC=440), the Incoming Connection Section addressed by DLR is pointed out to get significant data (InCS=112). Under this record (for InCS=112), according to the present invention and given that the DT1 message was received through an incoming connection section, SCCP fetches the forward RemACCref to find and temporary save for further invocation the RemACCref=255. Also under this record (InCS=112), the stored OutCS value is pointed out and addressed (OutCS=InCS-112). Given that the DT1 is found to be terminating in the current node, the user data in said message are delivered to the corresponding CO-user by appropriate protocol means outside the scope of the present invention. Once the message has been delivered to the CO-user, and just in case that the forward Remuneration Accounting function should be invoked in a terminating node, such an invocation takes place. For Remuneration Accounting, the SCCP will address the two counters stored under the temporary stored RemACCref=255, will increase the number of octets counter with the currently received amount of octets (in the transmitted DT1 message), and will step up the counter for number of messages delivered.

The accounting of DT1 messages on the backward direction (messages sent in the same direction as the original CC message) works in a similar manner as the accounting of DT1 messages on the forward direction (messages sent in the same direction as the original CR message).

As illustrated in FIG. 9i, when a CO-user in node D wants to send a DT1 message back to another CO-user in node A, the former indicates to the SCCP service in node D the previously received connection section identifier (InCS=112) along with the User Data to be sent.

When SCCP receives such an indication from a CO-user, the received connection section is addressed to get relevant data from such an InCS=112 storage. Under this record (for InCS=112), the Adj-SPC will be used as the current Destination signalling Point Code (DPC=330), namely the next node in the signalling path to be followed, where the message should be transmitted next. Also under this record (for InCS=112), the AdjCS will be used as the current Destination Local Reference (DLR=81), whereas the addressed InCS will be sent as the current Source Local Reference (SLR=112).

At this point and as illustrated in FIG. 9i, the SCCP in node D sends the DT1 message back to the DPC=330, with OPC=440 (own node), DLR=81, and SLR=112. Once this message is sent back, the SCCP in node D invokes the Accounting Verification function. To this end, according to the present invention and given that the DT1 message was sent through an incoming connection section, SCCP fetches in InCS=112 data the backward VerACCref to find VerACCref=444. The SCCP will address the two counters stored under such a VerACCref=444, will increase the number of octets counter with the currently sent amount of octets (in the sent DT1 message), and will step up the counter for number of messages sent.

As also illustrated in FIG. 9i, when the DT1 message is received in node C (SPC=330), the Outgoing Connection Section addressed by DLR is pointed out to get significant data (OutCS=81). Under this record (for OutCS=81), according to the present invention and given that the DT1 message was received through an outgoing connection section, SCCP fetches the backward RemACCref to find and temporary save for further invocation the RemACCref=200. Also under this record (OutCS=81), the stored InCS value is pointed out and addressed (InCS=32). Under this record (for InCS=32), the Adj-SPC will be used as the current Destination signalling Point Code (DPC=220), namely the next node in the signalling path to be followed, where the message should be transmitted next. Also under this record (for InCS=32), the AdjCS will be used as the current Destination Local Reference (DLR=238), whereas the addressed InCS will be sent as the current Source Local Reference (SLR=32). And still under this record (InCS=32), according to the present invention and given that the DT1 message will be sent through an incoming connection section, SCCP fetches the backward VerACCref to find and temporary save for further invocation the VerACCref=300.

At this point, the SCCP in node C transmits the DT1 message back to the DPC=220, with OPC=330 (own node), SLR=32, and DLR=238. Once this message is sent, the SCCP in node C invokes the backward Accounting function.

For Accounting Remuneration, the SCCP will address the two counters stored under the temporary stored RemACCref=200, will increase the number of octets counter with the previously received amount of octets (in the received DT1 message), and will step up the counter for number of messages transmitted.

For Accounting Verification, the SCCP will address the two counters stored under the temporary stored VerACCref=300, will increase the number of octets counter with the currently sent amount of octets (in the transmitted DT1 message), and will step up the counter for number of messages sent.

As illustrated in FIG. 9j, when the DT1 message is received in node B (SPC=220), the Outgoing Connection Section addressed by DLR is pointed out to get significant data (OutCS=238). Under this record (for OutCS=238), according to the present invention and given that the DT1 message was received through an outgoing connection section, SCCP fetches the backward RemACCref to find and temporary save for further invocation the RemACCref=444. Also under this record (OutCS=238), the stored InCS value is pointed out and addressed (InCS=157). Under this record (for InCS=157), the Adj-SPC will be used as the current Destination signalling Point Code (DPC=110), namely the next node in the signalling path to be followed, where the message should be transmitted next. Also under this record (for InCS=157), the AdjCS will be used as the current Destination Local Reference (DLR=100), whereas the addressed InCS will be sent as the current Source Local Reference (SLR=157). And still under this record (InCS=157), according to the present invention and given that the DT1 message will be sent through an incoming connection section, SCCP fetches the backward VerACCref to find and temporary save for further invocation the VerACCref=777.

At this point, the SCCP in node B transmits the DT1 message towards the DPC=110, with OPC=220 (own node), DLR=100, and SLR=157. Once this message is sent, the SCCP in node B invokes the backward Accounting function.

For Accounting Remuneration, the SCCP will address the two counters stored under the temporary stored RemACCref=444, will increase the number of octets counter with the previously received amount of octets (in the received DT1 message), and will step up the counter for number of messages transmitted.

For Accounting Verification, the SCCP will address the two counters stored under the temporary stored VerACCref=777, will increase the number of octets counter with the currently sent amount of octets (in the transmitted DT1 message), and will step up the counter for number of messages sent.

As also illustrated in FIG. 9j, when the DT1 message is received in node A (SPC=110), the Outgoing Connection Section addressed by DLR is pointed out to get significant data (OutCS=100). Under this record (for OutCS=100), according to the present invention and given that the DT1 message was received through an outgoing connection section, SCCP fetches the backward RemACCref to find and temporary save for further invocation the RemACCref=111.

Also under this record (OutCS=100), the stored InCS value is pointed out and addressed (InCS=OutCS-100). Given that the DT1 is found to be terminating in the current node, the user data in said message are delivered to the corresponding CO-user by appropriate protocol means outside the scope of the present invention. Once the message has been delivered to the CO-user, and just in case that the forward Remuneration Accounting function should be invoked in a terminating node, such an invocation takes place.

For Remuneration Accounting, the SCCP will address the two counters stored under the temporary stored RemACCref=111, will increase the number of octets counter with the previously received amount of octets (in the received DT1 message), and will step up the counter for number of messages delivered.

So far, and as the present invention proposes, all the DT1 messages coming and going in both directions are accounted under the appropriate counters. The accounting of other messages like RLSD or RLC can be carried out as for the already presented messages. Notice that a similar use case can be presented for DT2 messages by following the same method above. Said DT2 messages are used with another Protocol Class (PCLASS=3) and this is the reason why such messages are not included under the use case above, though any person skilled in the art can easily find how this invention also applies to said messages and protocol class.

This use case has been described in a non-restrictive manner, and other similar means to associate the applicable Accounting Criteria references with the Connection Section data can be found by anyone skilled in the art without being outside the main object of the present invention.

Industrial Applicability

As described above, the present invention is capable of controlling and registering all connection-oriented messages in a telecommunication service in which communication-sessions are performed using connection-oriented communication services. Since each incoming communication resource and each outgoing communication resource has stored therein a remuneration accounting reference as well as a verification accounting reference, all forward and backward signalling messages routed along the same path in a communication-session can be accounted for.

The invention is generally applicable to all connection-oriented telecommunication systems whilst the above-described explanations with respect to the SCCP SS7 telecommunication system only serves as one preferred example.

Furthermore, various modifications and variations can be carried out on the basis of the above teachings. In particular, the invention can comprise embodiments which are formed by features and/or steps which have been separately described in the description and claimed in the claims.

Reference numerals in the claims only serve clarification purposes and do not limit the scope of these claims.

What is claimed is:

1. A method for cascade accounting of connection-oriented communication sessions each being maintained between a first and a second subscriber station (SS-A; SS-D) of a telecommunication system (SYS) operating with connection-oriented services and comprising the sending of forward signalling messages (CR; DT1, DT2, RLC, RLSD) in the direction from said first subscriber station to said second subscriber station and backward signalling messages (CC; DT1, DT2, RLC, RLSD) in the direction from said second subscriber station to said first subscriber station through said telecommunication system (SYS) which includes:

a first network (A) serving a plurality of said first subscribers stations (SS-A) and including at least one first exchange (N10) having a plurality of outgoing communication resources (OutCS) for transmitting forward signalling messages (CR; DT1, DT2, RLC, RLSD) and for receiving backward signalling messages (CC, DT1, DT2, RLC, RLSD);

at least one transit network (B; C) including at least one transit exchange (N20; N30) having a plurality of incoming communication resources (InCS) for receiving forward signalling messages (CR, DT1, DT2, RLC, RLSD) and for transmitting backward signalling messages (CC, DT1, DT2, RLC, RLSD) and a plurality of outgoing communication resources (OutCS) for transmitting forward signalling messages (CR; DT1, DT2, RLC, RLSD) and for receiving backward signalling messages (CC; DT1, DT2, RLC, RLSD); and a second network (D) serving a plurality of said second subscribers stations (SS-B) and including at least one second exchange (N40) having a plurality of incoming communication resources (InCS) for receiving forward signalling messages (CR, DT1, DT2, RLC, RLSD) and for transmitting backward signalling messages (CC, DT1, DT2, RLC, RLSD), and wherein all signalling messages (CR, CC; DT1, DT2, RLC, RLSD) belonging to the same communication session are processed along the same path through the respective exchanges by the same incoming communication resource and the same outgoing communication resource of the respective exchanges involved in the communication session, comprising the following steps:

a) storing (S1) in each outgoing communication resource (OutCS) for a respective communication session a1) a verification accounting reference parameter (VerACCref) indicating a verification accounting means (F15, F16; F25, F26, F35, F36) for measuring the respective signalling traffic amount (S10; S20; S30) of the transmitted forward signalling messages (CR, DT1, DT2, RLC, RLSD); and a2) a remuneration accounting reference parameter (RemACCref) indicating a remuneration accounting means (F50, F51; F60, F61; F70, F71) for measuring the respective signalling traffic amount (S50; S60; S70) of received backward signalling messages (CR, DT1, DT2, RLC, RLSD);

b) storing (S2) in each incoming communication resource (InCS) during said communication session b1) a remuneration accounting reference parameter (RemACCref) indicating a remuneration accounting means (F20, F21; F30, F31; F40, F41) for measuring the respective signalling traffic amount (S10; S20, S30) of received forward signalling messages (CC, DT1, DT2, RLC, RLSD); and b2) a verification accounting reference parameter (VerACCref) indicating a verification accounting means (F45, F46; F55, F56; F65, F66) for measuring the respective signalling traffic amount (S40; S50; S60) of the transmitted backward signalling messages (CC, DT1, DT2, RLC, RLSD) of said communication session;

c1) accounting (S7a, S9a; S7b, S9b) of all forward signalling messages (CR, DT1, DT2, RLC, RLSD) belonging to the same communication session by measuring the signalling traffic of said forward signalling messages (CR, DT1, DT2, RLC, RLSD) by the respective verification accounting means as indicated via said verification accounting reference parameter in the respective outgoing communication resource (OutCS) and by the respective remuneration accounting means indicated via said remuneration accounting reference parameter in the respective incoming communication resource (InCS); and c2) accounting (S6a, S8a; S6b, S8b) of all backward signalling messages (CC, DT1, DT2, RLC, RLSD) belonging to the same communication session by measuring the signalling traffic of said backward signalling messages (CC, DT1, DT2, RLC, RLSD) by the respective remuneration accounting means indicated via said remuneration accounting reference parameter in the respective outgoing communication resource (OutCS) and by the respective verification accounting means indicated via said verification accounting reference parameter in the respective incoming communication resource (InCS).

2. A method according to claim 1, wherein said step c1) includes the following steps:

c11) whenever a forward signalling message is transmitted (S9b) from an outgoing communication resource (OutCS), accessing (S7b) said outgoing communication resource (OutCS) during a communication session, reading out (S7b) the verification accounting reference parameter (VerACCref) stored therein, invoking the verification accounting means indicated by said read-out verification accounting reference parameter, and measuring (S9b) the signalling traffic of said transmitted forward signalling message by said invoked verification accounting means; and c12) whenever a forward signalling message is received (S9a) by an incoming communication resource (InCS), accessing (S7a) said incoming communication resource (InCS), reading out (S7a) the remuneration accounting reference parameter (RemACCref) stored therein, invoking the remuneration accounting means indicated by said read-out remuneration accounting reference parameter, and measuring (S9a) the signalling traffic of said received forward signalling message by said invoked remuneration accounting means; and said step c2) includes the following steps:

c21) whenever a backward signalling message is transmitted (S8a) by said incoming communication resource (InCS), accessing (S6a) said incoming communication resource (InCS), reading out (S6a) the verification accounting reference parameter (VerACCref) stored therein, invoking said verification accounting means indicated by said read-out verification accounting reference parameter and measuring (S8a) the signalling traffic of the transmitted backward signalling message by said verification accounting means; and c22) whenever a backward signalling message is received (S8b) by an outgoing communication resource (OutCS), accessing said outgoing communication resource (OutCS), reading out (S6b) the remuneration accounting reference parameter (RemACCreD stored therein, invoking the remuneration accounting means indicated by said read-out remuneration accounting reference parameter, and measuring (S8b) the signalling traffic of the received backward signalling message by said invoked remuneration accounting means.

3. A method according to claim 1, wherein a verification accounting reference parameter (VerACCref) to be stored in an outgoing communication resource (OutCS) is determined by the following steps (S11–S16):

determining, when a forward signalling message (CR) is transmitted from said outgoing communication resource, a forward communication parameter set (DPC, GT, SSN, PCLASS) for said signalling message;

comparing this forward communication parameter set with a plurality of predefined accounting parameter sets (DPC, GT, SSN, PCLASS, VerACCref) each containing a respective verification accounting reference parameter (VerACCref) indicating a forward verification accounting means; and when a match is found between the parameter sets, reading out the verification accounting reference parameter (VerACCref) from said matching predefined accounting parameter set.

4. A method in accordance with claim 3, wherein as said communication parameter set a Destination Point Code (DPC), a Global Title (GT), a SubSystem Number (SSN) and a Protocol CLASS (PCLASS) parameter is used and as said accounting parameter sets of said DPC, GP, SSN, PCLASS parameters as well as a verification accounting reference (VerACCref) is used.

5. A method according to claim 1, wherein a verification accounting reference parameter (VerACCref) to be stored in an incoming communication resource (InCS) is determined by the following steps (S11–S16):

determining, when a backward signalling message (CC) is transmitted from said incoming communication resource, a backward communication parameter set (DPC, GT, SSN, PCLASS);

comparing this backward communication parameter set with a plurality of predefined accounting parameter sets (DPC, GT, SSN, PCLASS, VerACCref) each containing a verification accounting reference parameter (VerACCref) indicating a backward verification accounting means;

when a match between the parameter sets is found, reading out said verification accounting reference parameter (VerACCref) from said matching predefined accounting parameter set.

6. A method according to claim 1, wherein a remuneration accounting reference parameter (RemACCref) to be stored in an incoming communication resource (InCS) is determined by the following steps (S11–S16):

determining, when a forward signalling message (CR) is received by said incoming communication resource (InCS), a forward communication parameter set (OPC, GT, SSN, PCLASS);

comparing said forward communication parameter set with a plurality of predefined accounting parameter sets (OPC, GT, SSN, PCLASS, RemACCref) each containing a remuneration accounting reference parameter indicating a forward remuneration accounting means; and when a match is found between the parameter sets, reading out said remuneration accounting reference (RemACCref) parameter from said matching predefined accounting parameter set.

7. A method according to claim 6, wherein as said communication parameter set an Originating Point Code (OPC), a Global Title (GT), a Subsystem Number (SSN) and a Protocol Class (PCLASS) is used and as said accounting parameter sets said OPC, GT, SSN, a PCLASS parameter as well as a remuneration accounting reference parameter (RemACCref) is used.

8. A method according to claim 1, wherein a remuneration accounting reference parameter (RemACCref) to be stored in an outgoing communication resource (OutCS) is determined by the following steps (S11–S16):

determining, when a backward signalling message (CC) is received in said outgoing communication resource (OutCS), a backward communication parameter set (OPC, GT, SSN, PCLASS);

comparing this backward communication parameter set (OPC, GT, SSN, PCLASS) with a plurality of predefined backward communication accounting parameter sets (OPC, GT, SSN, PCLASS, RemACCref) each containing a remuneration accounting reference parameter indicating a backward remuneration accounting means; and when a match is found between said parameter sets, reading out the remuneration accounting reference parameter (RemACCref) from the matching predefined backward communication accounting parameter set.

9. A method according to claim 1, wherein when an exchange of the first network receives a communication set-up request from a first subscriber station, the forward signalling message is a communication request message issued by the exchange of the first network and the expected or corresponding backward signalling message is a communication confirmation message issued by the exchange of the second network serving a second subscriber station to which the communication set-up is requested by the first subscriber station.

10. A method according to claim 9, wherein a verification accounting reference parameter (VerACCref) for each outgoing communication resource (OutCS) and a remuneration accounting reference parameter (RemACCref) for each incoming communication resource (InCS) is determined and stored in each respective communication resource when said communication request message (CR) is sent from the exchange (A) of the first network to the exchange (D) of the second network through the respective transit exchange (B, C) of each transit network.

11. A method according to claim 9, wherein said verification accounting reference parameter (VerACCref) for each incoming communication resource (InCS) and said remuneration accounting reference parameter (RemACCref) for each outgoing communication resource (OutCS) is determined when the second exchange (D) serving the second subscriber station (SS-D) in the second network sends back, in response to receiving said communication request message (CR), said communication confirmation message (CC) to said first exchange (A) of said first network through said respective exchange (C, B) of the at least one transit network.

12. A method according to claim 1, wherein when a first communication session between a first subscriber station and a second subscriber station uses a predetermined first set of incoming and outgoing communication resources in the respective exchanges and a second communication session between said first subscriber station and said second subscriber station uses a second set of incoming and outgoing communication resources in each exchange, the same verification accounting reference parameters and remuneration accounting reference parameters are stored in the communication resources in both communication sessions such that in both communication sessions the same verification and remuneration accounting means measure the forward signalling traffic amount and the backward signalling traffic amount.

13. A method according to claim 1, wherein in said signalling message measuring steps, a first counter of the respective accounting means counting the number of messages and a second counter of the respective accounting means counts the numbers of octets of the message accounted for.

14. A method in accordance with claim 1, wherein said connection-oriented services are provided by the Signalling Connection Control Part (SCCP) of the Signalling System Number 7 (SS7).

15. A method according to claim 1, wherein for said incoming communication resource a SCCP SS7 Incoming Connection Section (InCS) is used, for said outgoing communication resource a SCCP SS7 Outgoing Connection Section (OutCS) is used, for said forward signalling messages a SCCP SS7 Connection Request message (CR), a Data Form 1 (DT1) message, a Data Form 2 (DT2) message, a Release Complete (RLC) message and a SCCP SS7 ReLeaSeD (RLSD) message is used and for said backward signalling messages a SCCP SS7 Connection Confirm (CC) message, a Data Form 1 (DT1) message, a Data Form 2 (DT2) message, a ReLease Complete (RLC) message and a SCCP SS7 Released (RLSD) message is used.

16. An exchange of a telecommunication system in which connection-oriented communication sessions are respectively maintained between a first and a second subscriber station (SS-A; SS-D) of a telecommunication system (SYS) operating with connection-oriented services by sending of forward signalling messages (CR; DT1, DT2, RLC, RLSD) in the direction from said first subscriber station to said second subscriber station and backward signalling messages (CC; DT1, DT2, RLC, RLSD) in the direction from said second subscriber station to said first subscriber station through said telecommunication system (SYS), including:

switching means (SW) for switching said signalling messages, including:

a plurality of outgoing communication resources (OutCS) for transmitting forward signalling messages (CR; DT1, DT2, RLC, RLSD) and for receiving backward signalling messages (CC, DT1, DT2, RCL, RLSD);

a plurality of incoming communication resources (InCS) for receiving forward signalling messages (CR, DT1, DT2, RLC, RLSD) and for transmitting backward signalling messages (CC, DT1, DT2, RLC, RLSD); wherein all signalling messages (CR, CC; DT1, DT2, RLC, RLSD) belonging to the same communication session are processed in the exchange by the same incoming communication resource and/or the same outgoing communication resource; and including an accounting means (ACC) for cascade accounting of said connection-oriented communication sessions, including:

a plurality of first verification accounting means (F15, F16; F25, F26; F35, F36, VER1) for measuring the signalling traffic amount (S10; S20, S30) of forward signalling messages (CR, DT1, DT2, RLC, RLSD) transmitted by a respective outgoing communication resource (OutCS);

a plurality of first remuneration accounting means (F20, F21; F30, F31; F40, F41, REM1) for measuring the signalling traffic amount (S10; S20, S30) of forward signalling messages (CR, DT1, DT2, RLC, RLSD) received by a respective incoming communication resource (InCS);

a plurality of second remuneration accounting means (F50, F51; F60, F61; F70, F71; REM2) for measuring the signalling traffic amount (S40; S50, S60) of backward signalling messages (CC, DT1, DT2, RLC, RLSD) received by a respective outgoing communication resource (OutCS); and a plurality of second verification accounting means (F45, F46; F55, F56; F65, F66, VER2) for measuring the signalling traffic amount (S40; S50, S60) of backward signalling messages (CC, DT1, DT2, RLC, RLSD) transmitted by a respective incoming communication resource (InCS);

memory means (MEM-OutCSI) in each outgoing communication resource (OutCS) for storing a verification accounting reference parameter (VerACCref) indicating one of said first verification accounting means and a remuneration accounting reference parameter (RemACCRef) indicating one of said second remuneration accounting means;

memory means (MEM-InCS1) in each incoming communication resource (InCS) for storing a remuneration accounting reference parameter (RemACCref) indicating one of said first remuneration accounting means and a verification accounting reference parameter (VerACCRef) indicating one of said second verification accounting means;

wherein at every transmission of a forward signalling message from said outgoing communication resource (OutCS), the verification accounting means indicated in said outgoing communication resource (OutCS) via said verification accounting reference parameter measures the signalling traffic of said transmitted forward signalling message;

wherein at every reception of a backward signalling message at said outgoing communication resource (OutCS) the remuneration accounting means indicated in said outgoing communication resource (OutCS) via said remuneration accounting reference parameter measures the signalling traffic of said received backward signalling message;

wherein at every reception of a forward signalling message at said incoming communication resource (InCS) the remuneration accounting means indicated in said incoming communication resource (InCS) via said remuneration accounting reference parameter measures the signalling traffic of said received forward signalling message;

wherein at every transmission of a backward signalling message at said incoming communication resource (InCS) the verification accounting means indicated in said incoming communication resource (InCS) via said verification accounting reference parameter measures the signalling traffic of said transmitted backward signalling message.

17. An exchange in accordance to claim 16, wherein said connection-oriented services are provided by the Signalling Connection Control Part (SCCP) of the Signalling System Number 7 (SS7).

18. An exchange according to claim 17, wherein said incoming communication resource is a SCCP SS7 Incoming Connection Section (InCS), said outgoing communication resource is a SCCP SS7 Outgoing Connection Section (OutCS), said forward signalling messages comprise a SCCP SS7 Connection Request message (CR), a Data Form 1 (DT1) message, a Data Form 2 (DT2) message, a SCCP SS7 ReLeaSeD (RLSD) message or a SCCP SS7 Release Complete (RLC) message and said backward signalling messages comprise a SCCP SS7 Connection Confirm (CC) message, a Data Form 1 (DT1) message, a Data Form 2 (DT2) message, a Release Complete (RLC) message, or a SCCP SS7 Released (RLSD) message.

19. A telecommunication system (SYS) operating with connection-oriented services where communication sessions between a first and a second subscriber station (SS-A; SS-D) are maintained by sending forward signalling messages (CR; DT1, DT2, RLC, RLSD) in the direction from said first subscriber station to said second subscriber station and backward signalling messages (CC; DT1, DT2, RLC, RLSD) in the direction from said second subscriber station to said first subscriber station through said telecommunication system (SYS), comprising:

a first network (A) serving a plurality of said first subscribers stations (SS-A) and including at least one first exchange (N10) having a plurality of outgoing communication resources (OutCS) for transmitting forward signalling messages (CR; DT1, DT2, RLC, RLSD) and for receiving backward signalling messages (CC, DT1, DT2, RLC, RLSD);

at least one transit network (B; C) including at least one transit exchange (N20; N30) having a plurality of incoming communication resources (InCS) for receiving forward signalling messages (CR, DT1, DT2, RLC, RLSD) and for transmitting backward signalling messages (CC, DT1, DT2, RLC, RLSD) and a plurality of outgoing communication resources (OutCS) for transmitting forward signalling messages (CR; DT1, DT2, RLC, RLSD) and for receiving backward signalling messages (CC; DT1, DT2, RLC, RLSD); and a second network (D) serving a plurality of said second subscribers stations (SS-B) and including at least one second exchange (N40) having a plurality of incoming communication resources (InCS) for receiving forward signalling messages (CR, DT1, DT2, RLC, RLSD) and for transmitting backward signalling messages (CC, DT1, DT2, RLC, RLSD); and wherein each exchange is constituted as defined in claim 16.

* * * * *